United States Patent
Kohama et al.

[11] Patent Number: 5,946,070
[45] Date of Patent: Aug. 31, 1999

[54] LIQUID CRYSTAL CELL HAVING FILLING PASSAGE PREVENTING TURN-AROUND FLOW OF LIQUID CRYSTAL

[75] Inventors: Takeshi Kohama, Okazaki; Nobuhiko Ohashi, Kariya; Masashi Inata, Okazaki; Kahoru Mori, Nukata-gun; Masaaki Ozaki, Kariya, all of Japan

[73] Assignee: Denso Corporation, Kariya, Japan

[21] Appl. No.: 09/048,261

[22] Filed: Mar. 26, 1998

[30] Foreign Application Priority Data

| Mar. 28, 1997 | [JP] | Japan | 9-077598 |
| Mar. 31, 1997 | [JP] | Japan | 9-080694 |
| Jan. 29, 1998 | [JP] | Japan | 10-017446 |

[51] Int. Cl.$^6$ .................. G02F 1/1339; G02F 1/1341
[52] U.S. Cl. .................. 349/156; 349/189; 349/190
[58] Field of Search .................. 349/156, 189, 349/190

[56] References Cited

U.S. PATENT DOCUMENTS

| 4,094,058 | 6/1978 | Yasutake et al. | 29/592 |
| 4,548,475 | 10/1985 | Brendle et al. | 349/189 |
| 4,640,583 | 2/1987 | Hoshikawa et al. | 349/190 |
| 4,682,858 | 7/1987 | Kanbe et al. | 349/156 |
| 4,720,173 | 1/1988 | Okada et al. | 350/341 |
| 4,820,025 | 4/1989 | Nakanowatari | 349/189 |
| 4,976,516 | 12/1990 | Carrington | 350/343 |
| 5,193,019 | 3/1993 | Watanabe | 359/62 |
| 5,381,255 | 1/1995 | Ohnuma et al. | 359/68 |
| 5,559,621 | 9/1996 | Minato et al. | 359/81 |
| 5,751,391 | 5/1998 | Yokoyama et al. | 349/189 |
| 5,798,813 | 8/1998 | Ohashi et al. | 349/190 |

FOREIGN PATENT DOCUMENTS

| 56-65120 | 6/1981 | Japan . |
| 57-188019 | 11/1982 | Japan . |
| 62-251722 | 11/1987 | Japan . |
| 3-174514 | 7/1991 | Japan . |
| 5-313110 | 11/1993 | Japan . |
| 8-95069 | 4/1996 | Japan . |
| 8-292456 | 11/1996 | Japan . |

*Primary Examiner*—William L. Sikes
*Assistant Examiner*—Tarifur R. Chowdhury
*Attorney, Agent, or Firm*—Pillsbury, Madison & Sutro LLP

[57] ABSTRACT

A first electrode plate and a second electrode plate are overlapped on each other with a seal member and spacer walls interposed therebetween. The cell gap formed between both plates is filled with liquid crystal such as smectic liquid crystal. To eliminate orientation disturbance of the liquid crystal caused in the filling process, the liquid crystal flow coming from the down stream of the display area through passages outside the display area (turn-around flow) is eliminated. Dam walls for preventing the liquid crystal flow through the outer passages or structures for reducing the flow speed are formed in the outer passages. Alternatively, the filling passages in the display area are separated from the outer passages. Thus, the liquid crystal is correctly oriented in the display area, thereby achieving uniformity of images displayed.

22 Claims, 14 Drawing Sheets

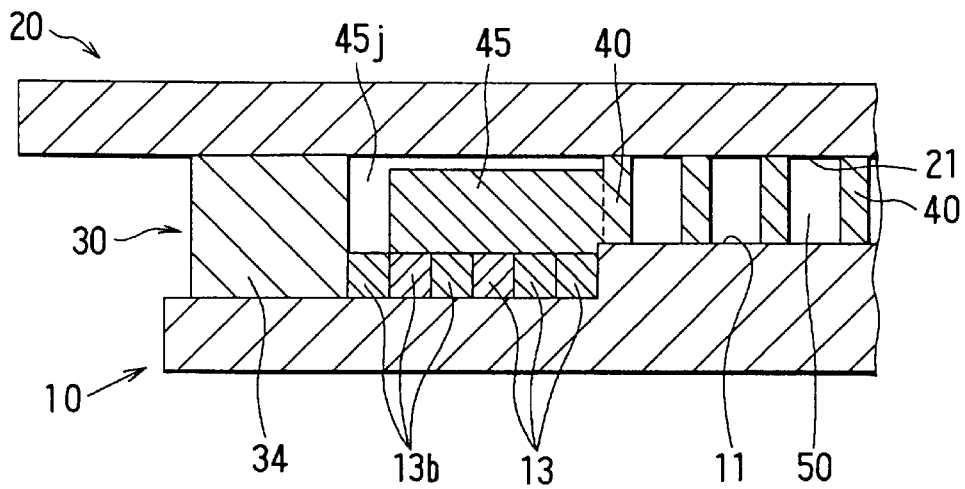
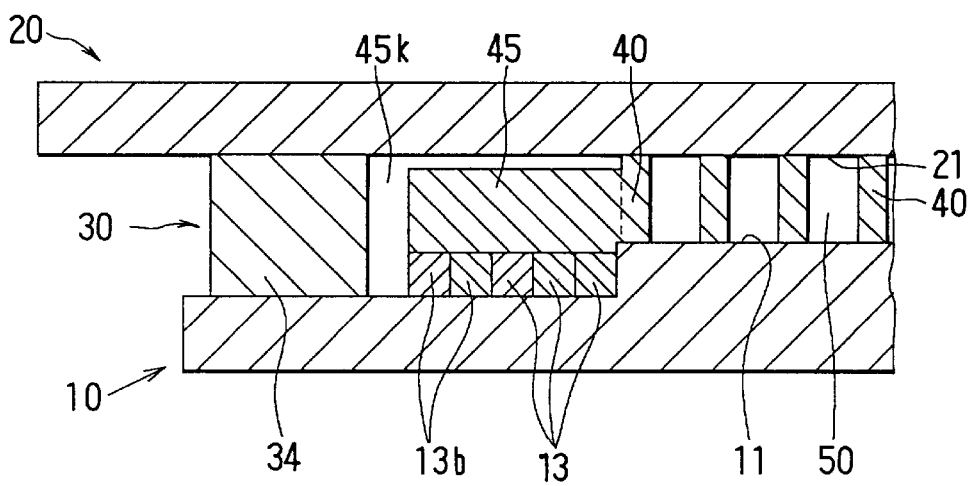
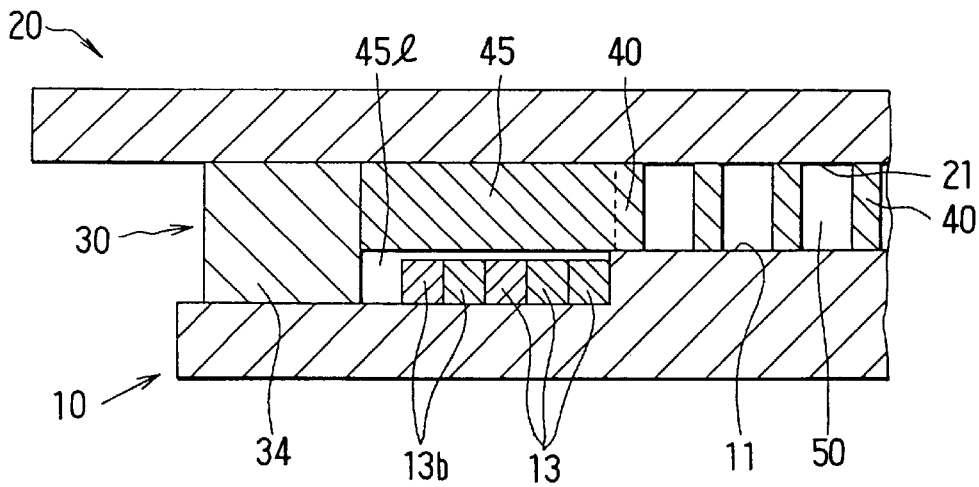

LIQUID CRYSTAL CELL HAVING FILLING PASSAGE PREVENTING TURN-AROUND FLOW OF LIQUID CRYSTAL

CROSS-REFERENCE TO RELATED APPLICATIONS

This application is based upon and claims benefit of priority of Japanese Patent Applications No. Hei-9-77598 filed on Mar. 28, 1997, No. Hei-9-80694 filed on Mar. 31, 1997 and No. Hei-10-17446, filed on Jan. 29, 1998, the contents of which are incorporated herein by reference.

BACKGROUND OF THE INVENTION

1. Field of the Invention

The present invention relates to a liquid crystal cell for displaying images thereon which uses smectic liquid crystal such as ferroelectric or antiferroelectric liquid crystal and nematic liquid crystal, and to a method of manufacturing the same.

2. Description of Related Art

Liquid crystal cells in which one electrode plate having a seal member and the other electrode plate having spacer walls are overlapped on each other to form a cell gap between two electrode plates are known hitherto. The cell gap is filled with liquid crystal such as smectic liquid crystal.

An example of this kind of liquid crystal cells is shown in FIGS. 29 and 30. On one electrode plate, seal member 1 is formed, and on the other electrode plate, plural spacer walls 3 are formed in parallel to each other. Two plates are overlapped to form a cell gap therebetween. The seal member includes side seals 1c, end seal 1b and end portions 1a defining an opening for filling the liquid crystal into the cell gap. The parallel spacer walls 3 are formed in a display area, leaving side passages at both sides. In a process to fill the cell gap with the liquid crystal, the cell is placed in a vacuum chamber and the liquid crystal is dropped at the filling opening. Then, the cell is heated to soften the liquid crystal and to close the filling opening. Then, the vacuum chamber is released to an atmospheric pressure so that a pressure difference is created between the outside of the cell gap and the cell gap closed by the liquid crystal. Liquid crystal 2 is sucked into the cell gap by the pressure difference through the inner passages between spacer walls 3 formed in the display area and the side passages between side seals 1c and the display area. Liquid crystal 2 moves at speed A1 through the inner passages while it moves at higher speed A2 through the outer passages as shown in FIG. 29. This is because the gap in the outer passages is larger than that of the inner passages (the inner passages include a color filter layer while the outer passages do not) and wettability of the liquid crystal in the outer passages is higher than that of the inner passages. Therefore, the liquid crystal sucked in through the outer passages reaches end seal 1b faster than the liquid crystal sucked in through the inner passages. Then, the liquid crystal which has reached end seal 1b turns its flow direction toward the inner passages (this is referred to as "turn-around flow" hereafter) as shown by arrows B in FIG. 30. The turn-around flow of the liquid crystal collides with the liquid crystal flowing in the inner passage at lower speed A1. This causes turbulence in the flow of the liquid crystal, and orientation of the liquid crystal is disturbed. If the orientation is disturbed, uniformity of the display on the liquid crystal cell will be damaged.

It is conceivable to form a dummy color filter layer in the outer passages to make the cell gap difference smaller. However, it is difficult to completely eliminate the cell gap difference because the dummy color filter layer is usually formed on a black mask layer which intercepts light emitted through the outer passages. Moreover, it is difficult to equalize wettability both in the outer passages and the inner passages. The liquid crystal is sucked into the cell gap by two driving forces, that is, the pressure difference between the cell gap and the outside, and a force caused by capillary effect in a small gap. When the size of the liquid crystal cell is small, e.g., six inches in diagonal, the pressure difference is predominant as a driving force of the liquid crystal. When the size is large, e.g., seventeen inches in diagonal, the pressure difference is predominant at the beginning of the filling process and the force by the capillary effect takes over at the last part of the filling process. In either case, as long as the cell gap difference in the outer and inner passages and the wettability difference exist, the orientation of the liquid crystal is disturbed by the turn-around flow caused by the flow speed difference in the outer and inner passages.

A proposal to equalize the liquid crystal flow speed in the cell by controlling the pressure in the filling process has been made in JP-A-5-313110. However, it has been found out that it is difficult to equalize the flow speed both in the inner and outer passages.

SUMMARY OF THE INVENTION

The present invention has been made in view of the above-mentioned problems, and an object of the present invention is to provide a liquid crystal cell in which liquid crystal is oriented correctly by minimizing the turn-around flow in its filling process, and more particularly to provide a cell structure which eliminates or minimizes the turn-around flow. Another object of the present invention is to provide a method of manufacturing the liquid crystal cell in which the liquid crystal is correctly oriented.

A first electrode plate having a plurality of parallel spacer walls and a second electrode plate having a seal member formed around its periphery except an opening for charging liquid crystal are overlapped on each other, forming a cell gap between both plates. In the cell gap, inner passages are formed between the parallel spacer walls and outer passages at both sides of the inner passages. The liquid crystal is charged from the opening through both passages into the cell gap.

According to the present invention, a dam or dam wall is formed in each outer passage to intercept the liquid crystal flow therethrough. The liquid crystal is charged into the cell gap only through the inner passages. Therefore, the turn-around flow (the liquid crystal flow coming into the inner passages from their down stream side through the outer passages) is eliminated. The dam wall may be made not to completely intercept the liquid crystal flow in the outer passages, leaving a narrow through-passage open. In this case some of the liquid crystal flows through the through-passage at a speed lower than the flow speed in the inner passage, thereby avoiding the turn-around flow. Dummy pixels may be formed underneath the dam wall, and in addition to the dummy pixels a black mask layer may be formed underneath the dummy pixels. The dam wall may be made in various ways. It may be made by extending a side seal form the seal member, by extending a side wall from the spacer wall or by extending both and abutting them at a half way.

For the purpose of slowing down the liquid crystal flow speed in the outer passages, it is also possible to deform the seal member or the spacer wall which faces the outer passage. The seal member facing the outer passage may be made in a zigzag shape, thereby creating additional flow resistance in the outer passage. Projections sticking out into the outer passage from the spacer wall may be made for the same purpose.

To eliminate the turn-around flow, it is also effective to separate the inner passages from the outer passages. The parallel spacer walls between which the inner passages are formed may be connected to each other at the down stream, thereby closing the down stream of the inner passages. The spacer walls may be extended to abut with the end seal portion of the seal member, thereby closing the down stream of the inner passages.

Because the turn-around flow of the liquid crystal in the filling process is eliminated according to the present invention, the liquid crystal charged into the cell gap is correctly oriented and uniformity of images displayed on the liquid crystal cell is achieved.

Other objects and features of the present invention will become more readily apparent from a better understanding of the preferred embodiments described below with reference to the following drawings.

BRIEF DESCRIPTION OF THE DRAWINGS

FIG. 19 is a cross-sectional view showing a dam portion as modification 1 of the fourth embodiment;

FIG. 20 is a cross-sectional view showing a dam portion as modification 2 of the fourth embodiment;

FIG. 21 is a cross-sectional view showing a dam portion as modification 3 of the fourth embodiment;

DETAILED DESCRIPTION OF THE PREFERRED EMBODIMENTS

Figure 1:
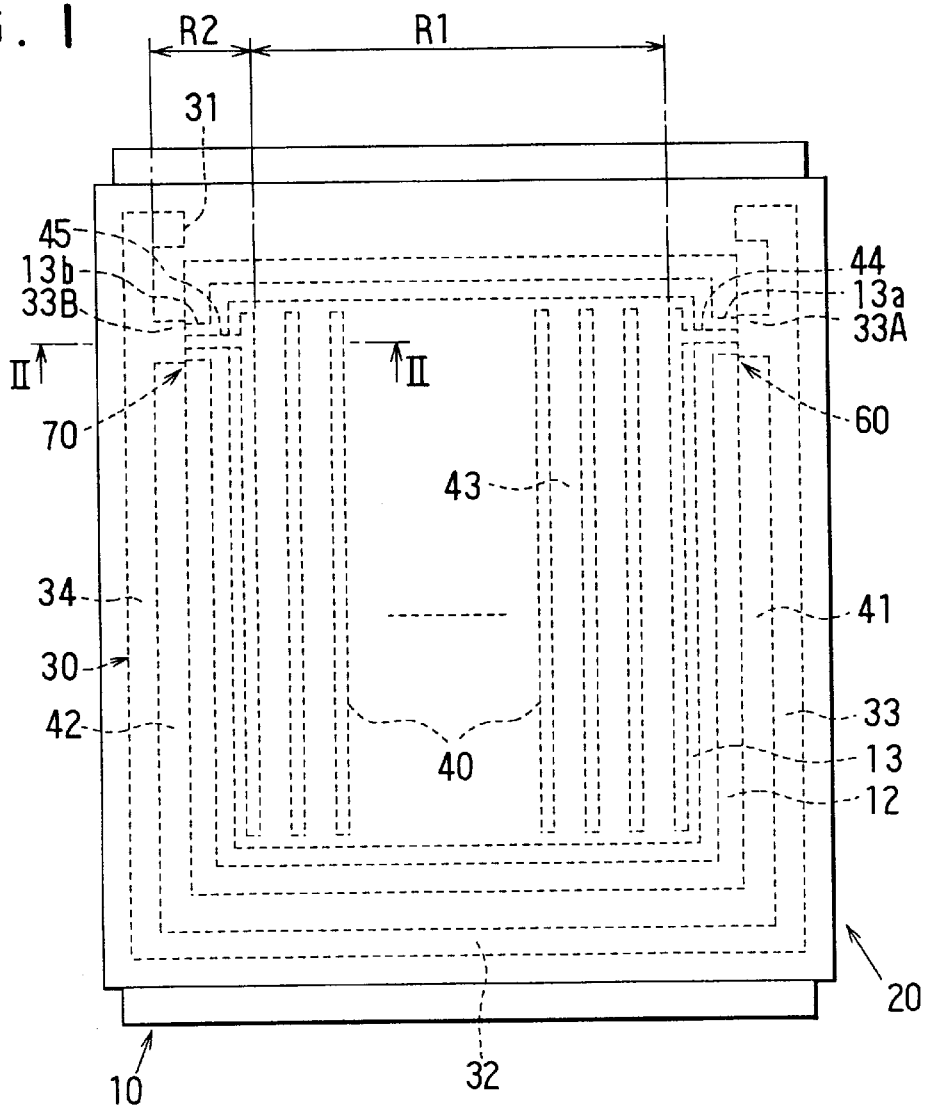
FIG. 1 is a plan view showing a liquid crystal cell as a first embodiment according to the present invention.

Referring to FIGS. 1 to 5, a first embodiment according to the present invention will be described. FIG. 1 shows a plan view of a liquid crystal cell in which first electrode plate 10 having spacer walls 40 formed thereon together with other layers and second electrode plate 20 having seal member 30 formed thereon are overlapped on each other, forming a single cell. Between two electrode plates 10 and 20, a cell gap is formed which is filled with liquid crystal 50 such as smectic liquid crystal. The cell includes display area R1 on which images are displayed and non-display area R2 formed outside display area R1.

Figure 2:
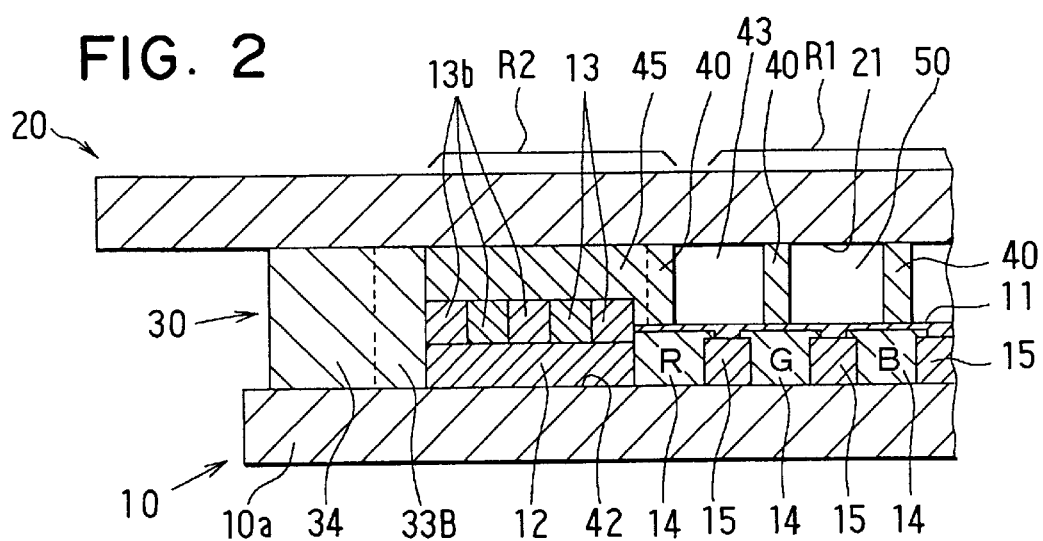
FIG. 2 is a cross-sectional view taken along a line II—II of FIG. 1, showing a dam portion in an enlarged scale.

Details of the structure of the cell is shown in FIG. 2 as a cross-sectional view. First electrode plate 10 includes plate 10a having a transparent substrate and two layers, a transparent electrode layer and an insulating layer, both layers being laminated on the substrate in this order. In a space encircled by seal member 30 formed on second electrode plate 20, color filter layer 14 including plural sets of pixels R (red), G (green) and B (blue) and black mask layer 15 interposed between pixels are formed. Orientation layer 11 is formed on both layers 14 and 15. Black mask layer 12 is formed on plate 10a to encompass the layers 14, 15 and 11 therein as shown in FIGS. 1 and 2. On black mask 12, two dummy pixels 13 and three additional dummy pixels 13b are formed as better seen in FIG. 3. Black mask layer 12, dummy pixels 13 and additional dummy pixels 13b are located in non-display area R2, while color filter layer 14, black mask layer 15 and orientation layer 11 are located in display area R1. Plural spacer walls 40 running in parallel to side seals 33 and 34 are formed on orientation layer 11 of first electrode plate 10, so that each of them is located on each pixel (R, G, B) of color filter layer 14. Spacer walls 40 are formed so that they run along and under transparent electrodes of second electrode plate 20.

Second electrode plate 20 is composed of a transparent substrate and two layers, a transparent electrode layer and an insulating layer, both layers being laminated in this order on the transparent substrate. An orientation layer 21 is formed on second electrode plate. Seal member 30 including side seals 33 and 34, end seal 32 and end portions 31 (refer to FIG. 1) are formed on the periphery of second electrode plate 20, so that orientation layer 21 is located inside seal member 30.

First electrode plate 10 and second electrode plate 20 are overlapped on each other, forming a cell gap with seal member 30 and spacer walls 40 interposed therebetween. The cell gap is filled with liquid crystal 50 such as smectic liquid crystal. The transparent electrodes of first electrode plate 10 and the transparent electrodes of second electrode plate 20 which run perpendicularly to the former constitute a electrode matrix. The electrode matrix constitutes a number of pixels together with liquid crystal 50 and color filter layer 14. Liquid crystal 50 is charged into the cell gap from an opening between both seal end portions 31. Plural inner passages 43 are formed between neighboring spacer walls 40, and outer passages 41 and 42 are formed between side seal 33 and an outer spacer wall 40 and between side seal 34 and an outer spacer wall 40, respectively. Inner passages 43 are all located within display area R1 and both outer passages 41 and 42 are located in non-display area R2.

Figure 3:
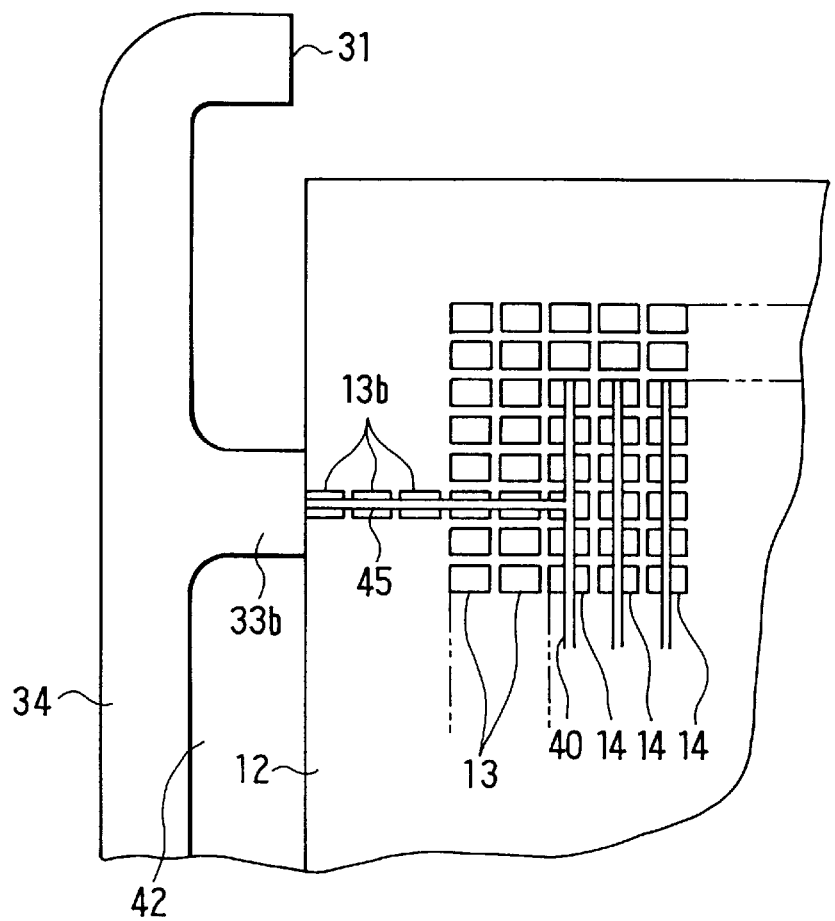
FIG. 3 is a fragmentary plan view showing the dam portion in further enlarged scale, with a second electrode plate removed.
Figure 4:
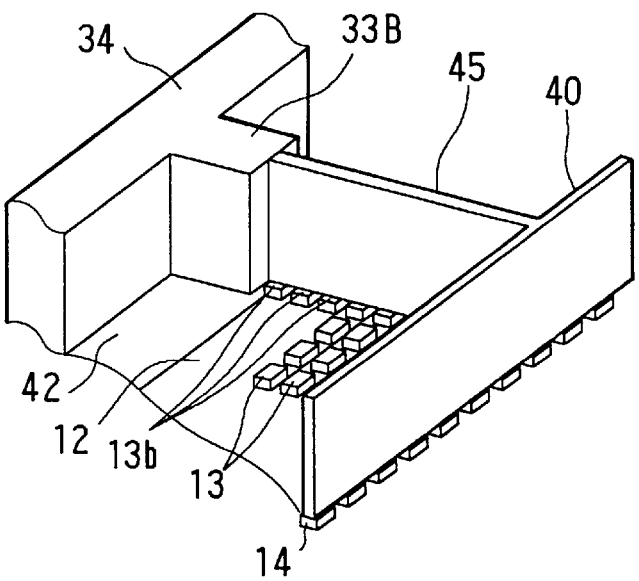
FIG. 4 is a perspective view showing the dam portion shown in FIG. 3.

In this first embodiment, both outer passages 41 and 42 are closed by dams 60 and 70 as shown in FIG. 1. The structure of dam 70 are shown in FIGS. 3 and 4 in detail. Because another dam 60 has the same structure as that of dam 70, only the structure of dam 70 will be described in detail. One of the spacer walls 40 located at the outer most position in display area R1 has a side wall 45 extending toward side seal 34. Also, side seal 34 has side seal projection 33B extending toward the outer most spacer wall. Side wall 45 and side seal projection 33B abuts with each other, thereby forming dam 70 which closes outer passage 42. Side wall 45 is formed on dummy pixels 13 and additional dummy pixels 13b. Underneath dummy pixels 13 and additional dummy pixels 13b, black mask layer 12 is formed. Thus, outer passage 42 is completely closed by dam 70, and outer passage 41 is also closed in the same manner by dam 60.

Figure 5:
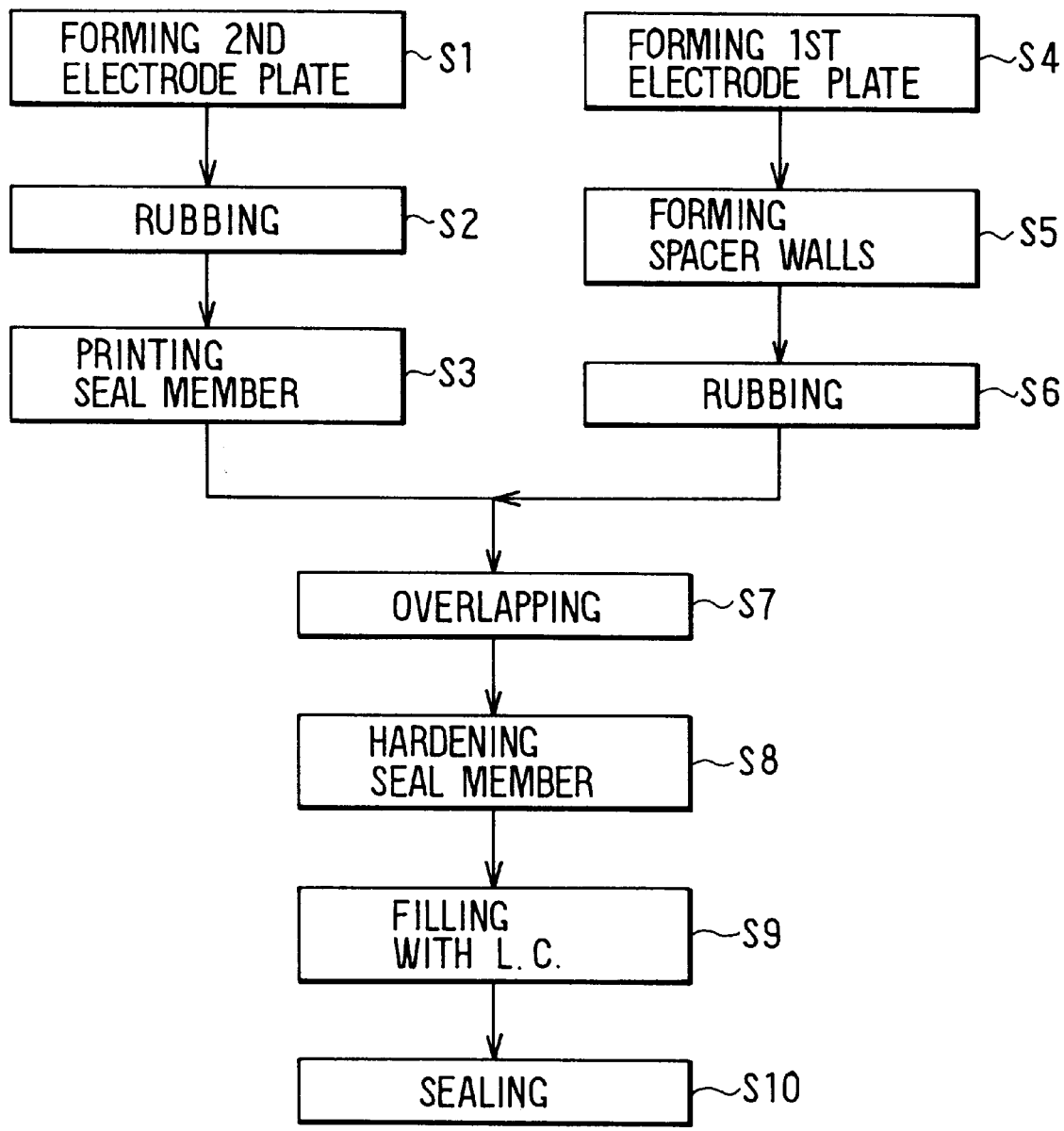
FIG. 5 is a flow chart showing a manufacturing process of the liquid crystal cell shown in FIG. 1.

Referring to FIG. 5, a manufacturing process of the liquid crystal cell will be described. Second electrode plate 20 having a transparent substrate, a transparent electrode layer, an insulating layer and an orientation layer 21 is made in step S1. Then, orientation layer 21 is rubbed to give it an ability to orientate the liquid crystal in step S2. Seal member 30 including side seals 33 and 34, end seal 32 and end portions 31 is formed on second electrode plate 20 in step S3. Side seal projections 33A and 33B are also formed at the same time. Seal member 30 is made by printing a thermosetting epoxy resin. In step S4 first electrode plate 10 including black mask layers 12 and 15, color filter layer 14, dummy pixels 13, additional dummy pixels 13a and 13b is made in step 4 by using known patterning technique. Also, orientation layer 11 is formed to cover display area R1. Plural spacer walls 40 including side walls 44 and 45 are formed on orientation layer 11 of first electrode plate 10 in step 5 so that they run in parallel to side seals 33 and 34. Spacer walls 40 may be made of a resin which is hardened by exposing to light such as ultraviolet ray in known patterning technique. Then rubbing is performed on orientation layer 11 in step S6. In step S7, first electrode plate 10 and second electrode plate 20 are overlapped on each other with seal member 30 and spacer walls 40 interposed therebetween, thereby forming a cell gap. Then, in step S8, seal member 30 is hardened by heating while imposing pressure on both outer surfaces of the overlapped cell to set the cell gap at a predetermined dimension. Thus, a vacant cell having no liquid crystal charged therein is completed.

In step S9, liquid crystal 50 such as smectic liquid crystal is charged into the cell gap. The cell is put in a vacuum chamber to draw out air from the cell gap. Then, the liquid crystal to be charged is dropped on the opening of seal member 30 in a form of droplets. Then, the cell is heated in the vacuum chamber to soften the liquid crystal droplets so that the softened liquid crystal closes the opening of seal member 30. Then, the vacuum chamber is opened to atmospheric pressure, thereby generating pressure difference between the inside of the cell gap and the outside thereof. By the pressure difference, the liquid crystal is drawn into the cell gap. Because both outer passages 41 and 42 are closed by dams 60 and 70, respectively, the liquid crystal is charged into the cell gap only through inner passages 43 in display area R1. Therefore, orientation disturbance caused by the turn-around flow of liquid crystal charged through outer passages in conventional structure is avoided. Accordingly, the liquid crystal is correctly oriented in the cell gap, not depending on the size of the cell. In addition, light leakage from non-display area R1 is avoided by black mask 12 and dummy pixels 13.

Though only one dam 60 or 70 is disposed in each outer passage 41 or 42 at a vicinity of the filling opening of seal member 30 in the embodiment described above, more than one dam may be disposed in each outer passage, and the dam may be placed at any position in outer passages 41 and 42.

Figure 6:
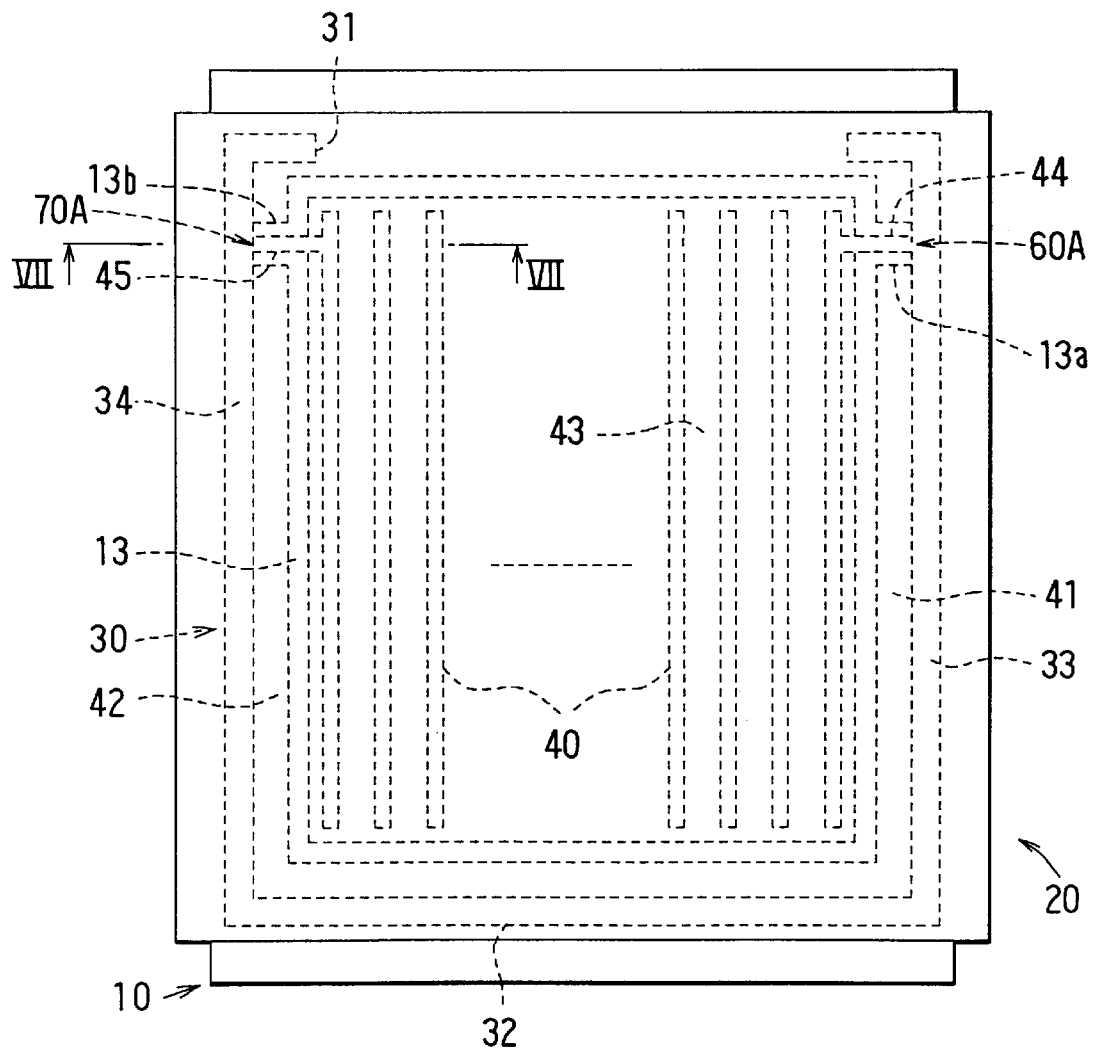
FIG. 6 is a plan view showing a liquid crystal cell as a second embodiment according to the present invention.
Figure 7:
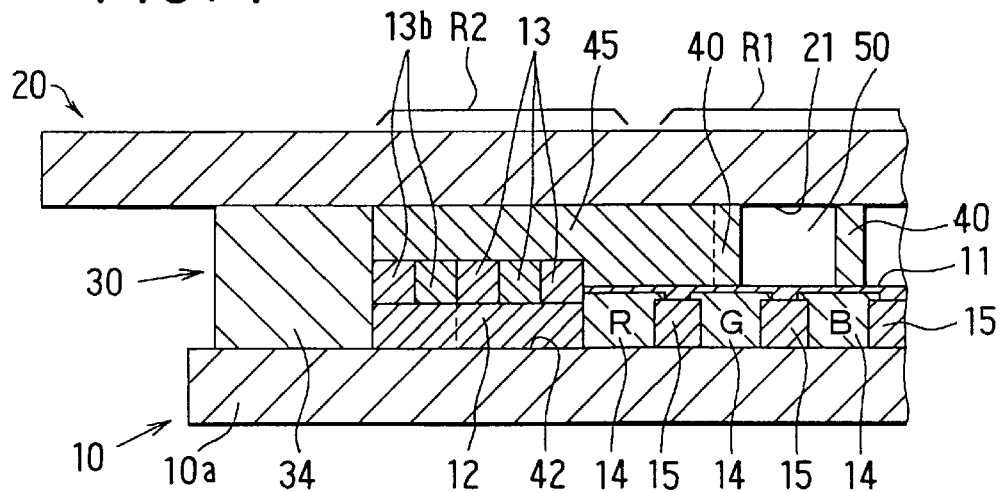
FIG. 7 is a cross-sectional view taken along a line VII—VII of FIG. 6 showing a dam portion in an enlarged scale.

Referring to FIGS. 6 and 7, a second embodiment will be described. In this embodiment, dams 60 and 70 of the first embodiment for closing outer passages 41 and 42 are replaced by dams 60A and 70A which perform the same function as the dams 60 and 70 of the first embodiment. Side seal projections 33A and 33B of the first embodiment are eliminated in this embodiment, and side walls 44 and 45 projecting from spacer walls 40 located at outer fringes of display area R1 are further extended so that they close the entire width of outer passages 41 and 42. Some more detailed structure of dam 70A (dam 60A has the same structure) is shown in FIG. 7. The number of dummy pixels 13 is three in this embodiment, and the number of additional pixels 13b is two. Black mask 12 formed to encircle display area R1 is located underneath dummy pixels 13, and black mask 12 is extended to its side only underneath additional dummy pixels 13b. Other structures of the second embodiment are the same as those of the first embodiment.

Figure 8:
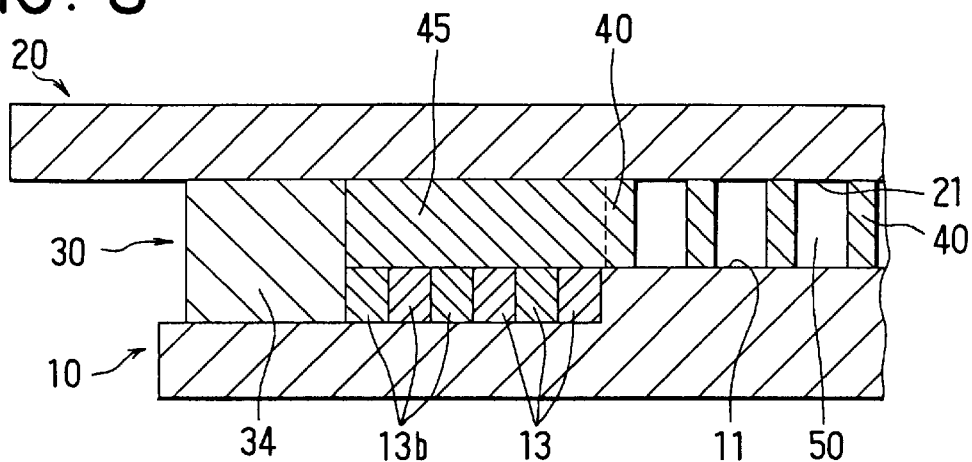
FIG. 8 is a cross-sectional view showing a dam portion as modification 1 of the second embodiment.
Figure 9:
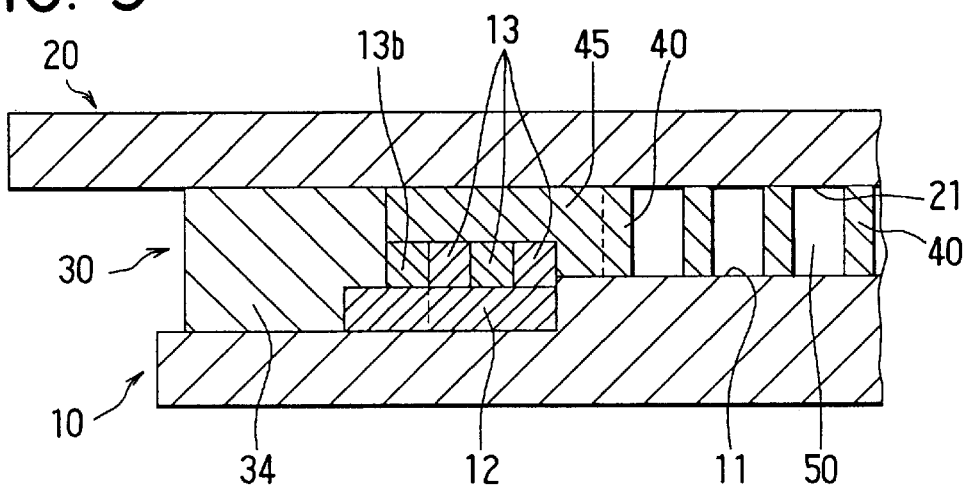
FIG. 9 is a cross-sectional view showing a dam portion as modification 2 of the second embodiment.
Figure 10:
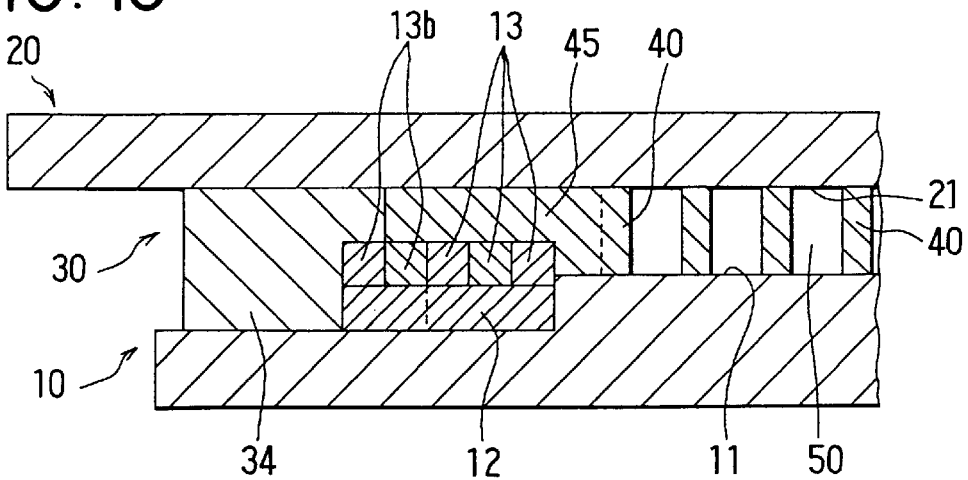
FIG. 10 is a cross-sectional view showing a dam portion as a further modification of modification 2 of the second embodiment.

Several modifications of the second embodiment is shown in FIGS. 8 to 12. In FIGS. 8, 9 and 10 showing a cross-sectional views of dams 70A, layers 11, 14 and 15 formed on first electrode plate 10 are not shown because they are the same as those described above. These layers are not shown also in the similar drawings referred to in the later description.

Figure 11:
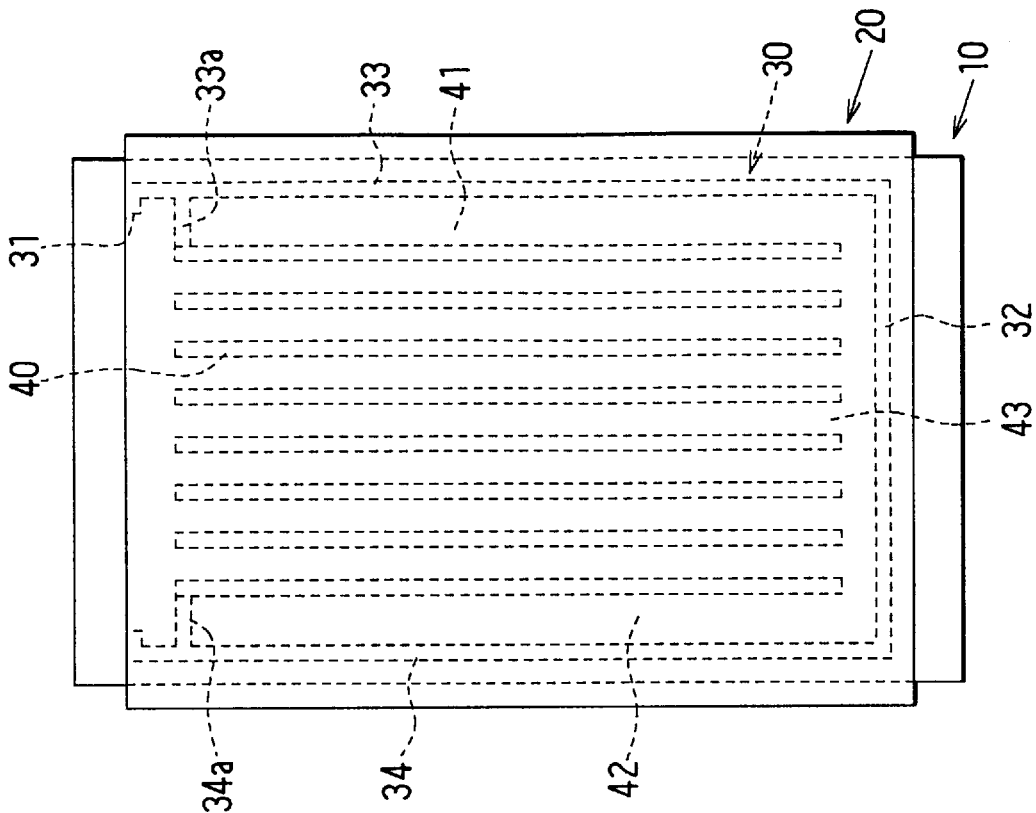
FIG. 11 is a plan view showing a liquid crystal cell as modification 3 of the second embodiment.
Figure 12:
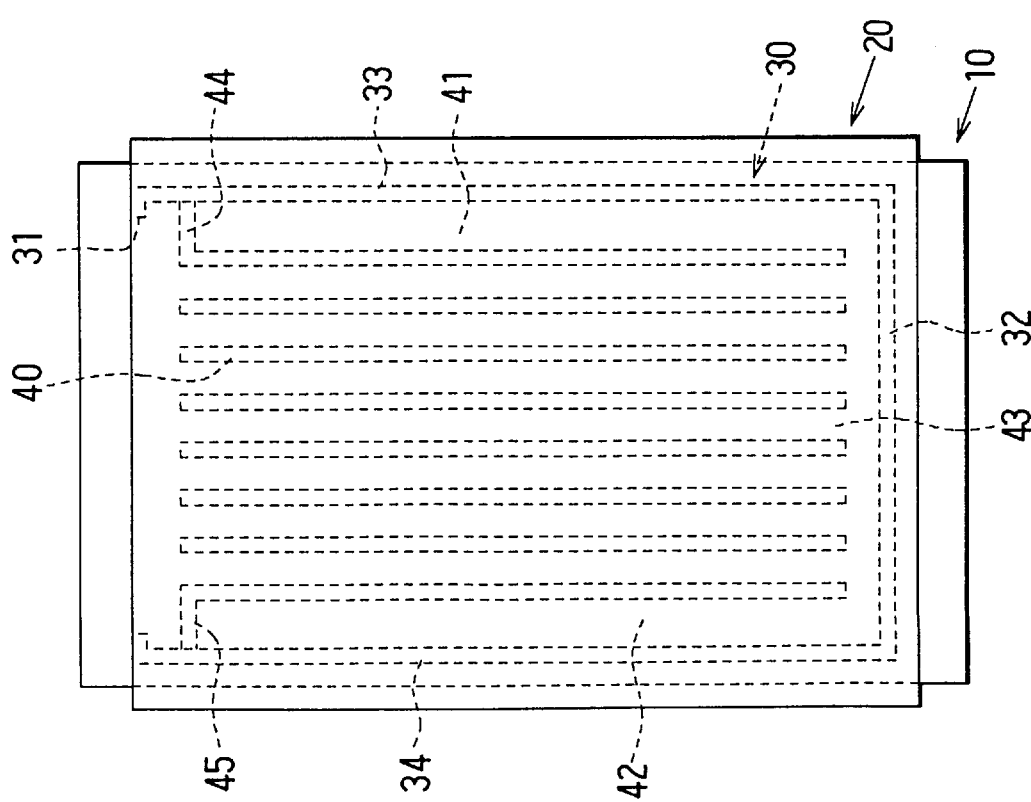
FIG. 12 is a plan view showing a liquid crystal cell as modification 4 of the second embodiment.

FIG. 8 shows modification 1 in which black mask 12 is eliminated, and three dummy pixels 13 and three additional dummy pixels 13b are formed directly on first electrode plate 10. Side wall 45 is extended from spacer wall 40 to close outer passage 42 in the same manner as in the second embodiment. FIG. 9 shows modification 2 in which one additional dummy pixel 13b is eliminated. In place of the eliminated additional dummy pixel, a part of side seal 34 is extended on black mask 12. Side wall 45 is formed on dummy pixels 13 and additional dummy pixel 13b so that it closes outer passage 42 in the same manner as in the second embodiment. FIG. 10 shows a further modification of modification 2 shown in FIG. 9. In this modification, the number of additional dummy pixels 13b is two, and the shape of side seal 34 is changed, so that its tip abuts with the tip of side wall 45 on additional dummy pixels 13b. FIG. 11 shows modification 3 in which side walls 44 and 45 are formed at the end portions of spacer walls 40. Therefore, dams 60A and 70A are located very close to the filling opening of seal member 30. FIG. 12 shows modification 4 in which side walls 44 and 45 extending from spacer walls 40 are eliminated, and side seal projections 33a and 34a extend from side seals 33 and 34. Side seal projections 33a and 34a form dam 60A and 70A in the same manner as in the second embodiment.

Figure 13:
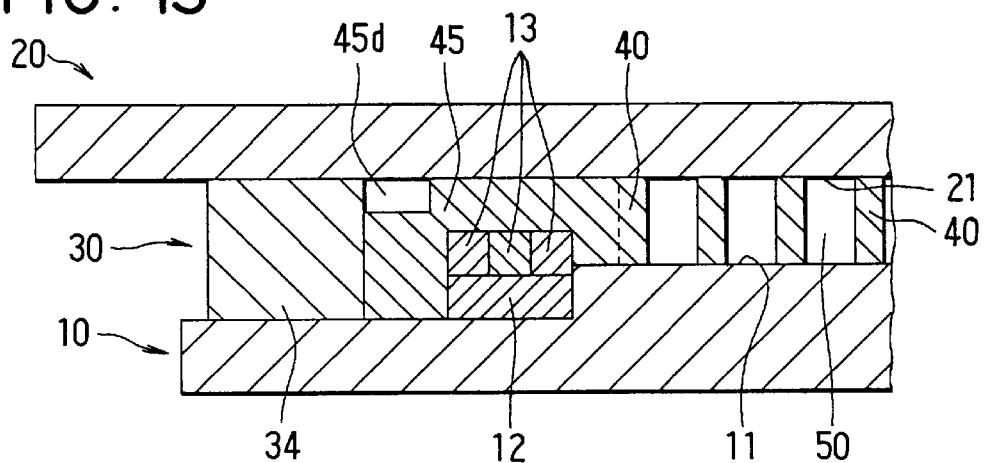
FIG. 13 is a cross-sectional view showing a dam portion of a liquid crystal cell as a third embodiment according to the present invention.

Referring to FIG. 13, a third embodiment according to the present invention will be described. In this embodiment, through-passage 45d is formed on side wall 45, black mask 12 is shortened and additional dummy pixels 13b are eliminated. Side wall 45 forms a dam closing outer passage 42, leaving a small through-passage 45d open. Other structures are the same as those in the second embodiment. The cross-sectional area of through-passage 45d is designed so that a flow speed of the liquid crystal in through-passage 45d is substantially equal to or slower than the flow speed in inner passages 43 when the liquid crystal is charged into the cell gap. Therefore, the turn-around flow caused by the liquid crystal flowing through the outer passages can be eliminated by this structure, too.

Figure 14:
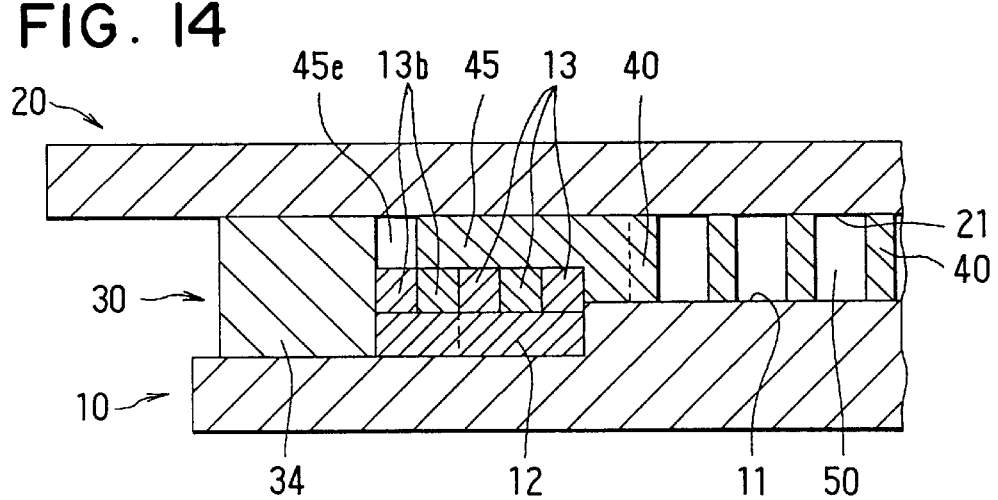
FIG. 14 is a cross-sectional view showing a dam portion as modification 1 of the third embodiment.
Figure 15:
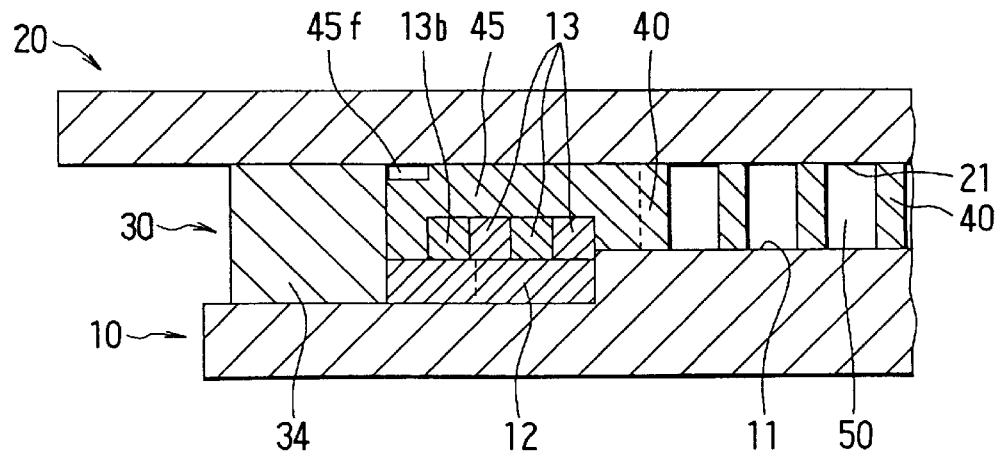
FIG. 15 is a cross-sectional view showing a dam portion as modification 2 of the third embodiment.
Figure 16:
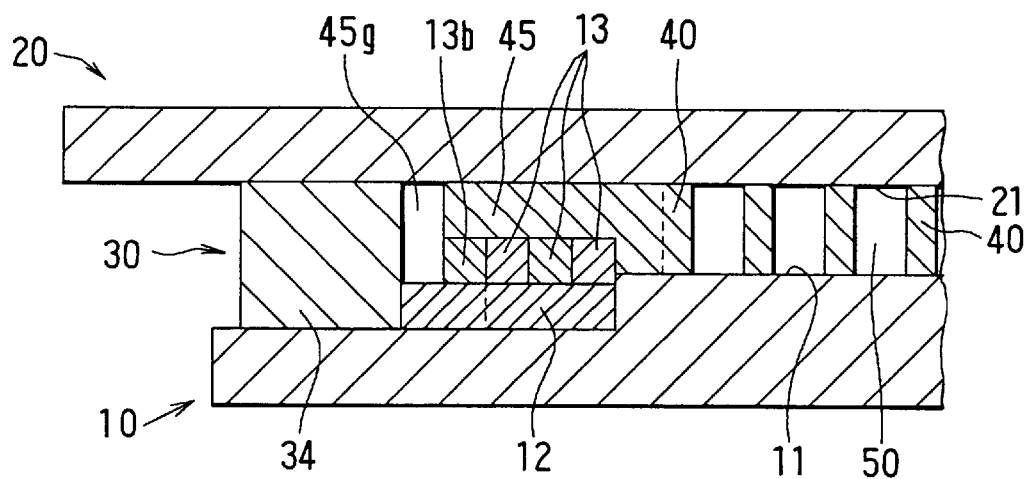
FIG. 16 is a cross-sectional view showing a dam portion as modification 3 of the third embodiment.
Figure 17:
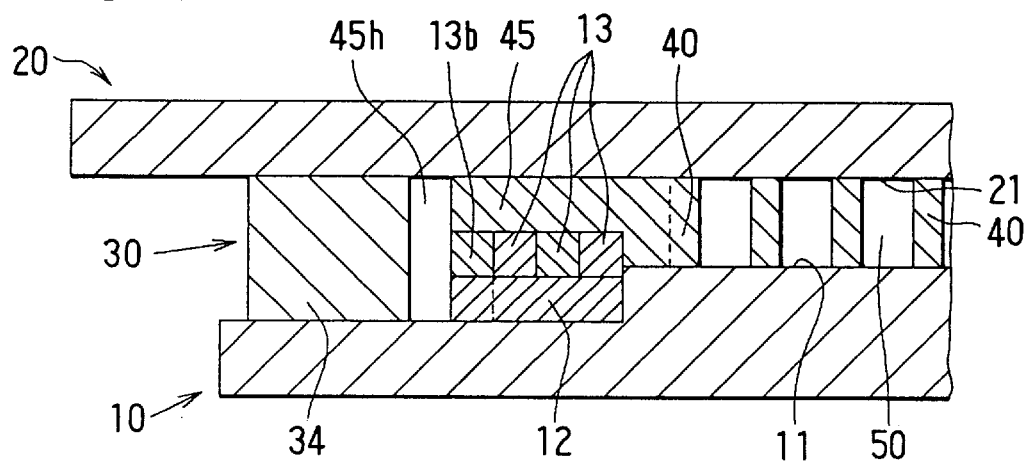
FIG. 17 is a cross-sectional view showing a dam portion as modification 4 of the third embodiment.

FIGS. 14 to 17 show several modifications of the third embodiment. FIG. 14 shows modification 1 in which the cross-sectional shape of through-passage 45e is modified from the third embodiment. Also, additional dummy pixels 13b are added and black mask layer 12 is extended, compared with the third embodiment. The cross-sectional area of through-passage 45e is designed in the same manner as in the third embodiment. FIG. 15 shows modification 2 in which the shape of through-passage 45f is further modified from modification 1. Also, one additional pixel 13b is eliminated. FIG. 16 shows modification 3 in which the shape of through-passage 45g is further modified, enlarging the cross-sectional area of the through-passage. FIG. 17 shows modification 4 in which through-passage 45h is further enlarged by shortening black mask 12. The cross-sectional area of any through-passages has to be made so that a liquid crystal flow speed therein does not exceed that in the inner passage to avoid the turn-around flow.

Figure 18:
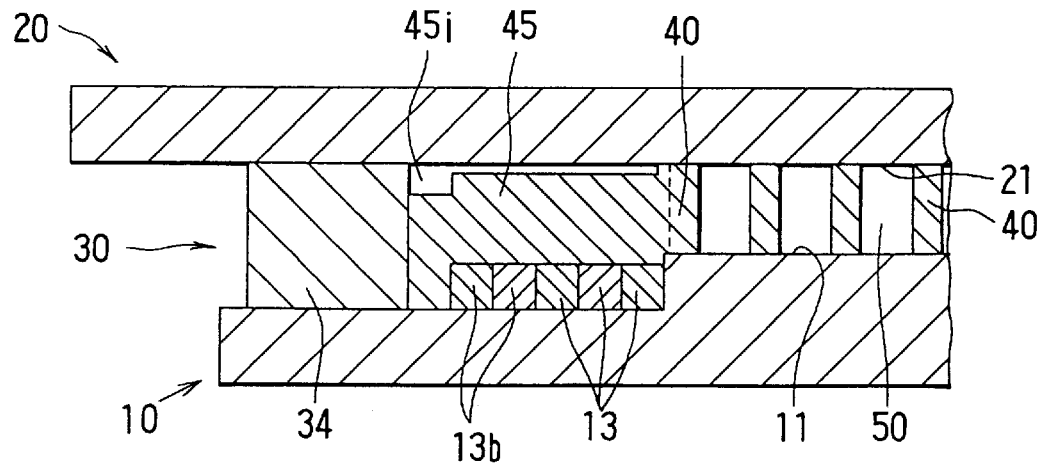
FIG. 18 is a cross-sectional view showing a dam portion of a liquid crystal cell as a fourth embodiment according to the present invention.

A fourth embodiment according to the present invention is shown in FIG. 18 in which black mask layer 12 underneath dummy pixels 13 and additional dummy pixels 13b is eliminated. Dummy pixels 13 and additional dummy pixels 13b are formed directly on first electrode plate 10. Side wall 45 extending from spacer wall 40 is formed on dummy pixels 13 and additional dummy pixels 13b so that it closes outer passage 42, leaving thin and flat through-passage 45i between second electrode plate 20 and side wall 45. As shown in FIG. 19, through-passage 45i has a crank-like shape. The cross-sectional area of through-passage 45i has to be designed so that the flow speed of the liquid crystal does not exceed the flow speed in inner passages 43 in the same manner as in the second and third embodiments.

Several modifications of the fourth embodiment are shown in FIGS. 19 to 21. In modification 1 shown in FIG. 19, one more additional dummy pixel 13b is added, and inversely L-shaped through-passage 45j is formed in outer passage 42. In modification 2 shown in FIG. 20, through-passage 45k is somewhat enlarged to reach the surface of first electrode plate 10. In modification 3 shown in FIG. 21, inversely L-shaped through-passage 45l is formed between dummy pixels 13 (including additional dummy pixels 13b) and side wall 45 which abuts with side seal 34. Each cross-sectional area of the through-passages of these modifications has to be designed so that the liquid crystal flow speed therethrough does not exceed the flow speed through inner passages 43.

Figure 22:
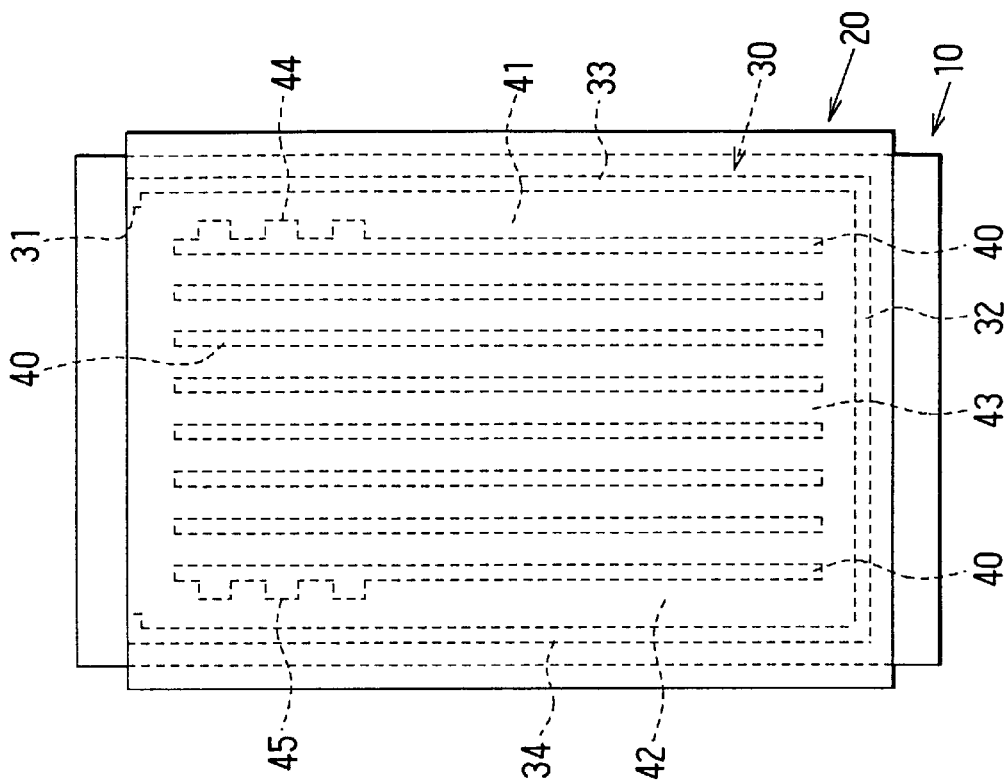
FIG. 22 is a plan view showing a liquid crystal cell as a fifth embodiment according to the present invention.

A fifth embodiment is shown in FIG. 22, in which the dams formed in outer passages 41 and 42 in the foregoing embodiments are eliminated. Instead, side seals 33b and 34b are made in a zigzag shape so that the liquid crystal flows slowly through outer passages 41 and 42 when it is charged into the cell gap. In other words, the liquid crystal flow speed in outer passages 41 and 42 is restricted by the zigzag shape of side seals 33b and 34b so that it does not exceed the flow speed in inner passages 43, thereby avoiding the turn-around flow of the liquid crystal.

Figure 23:
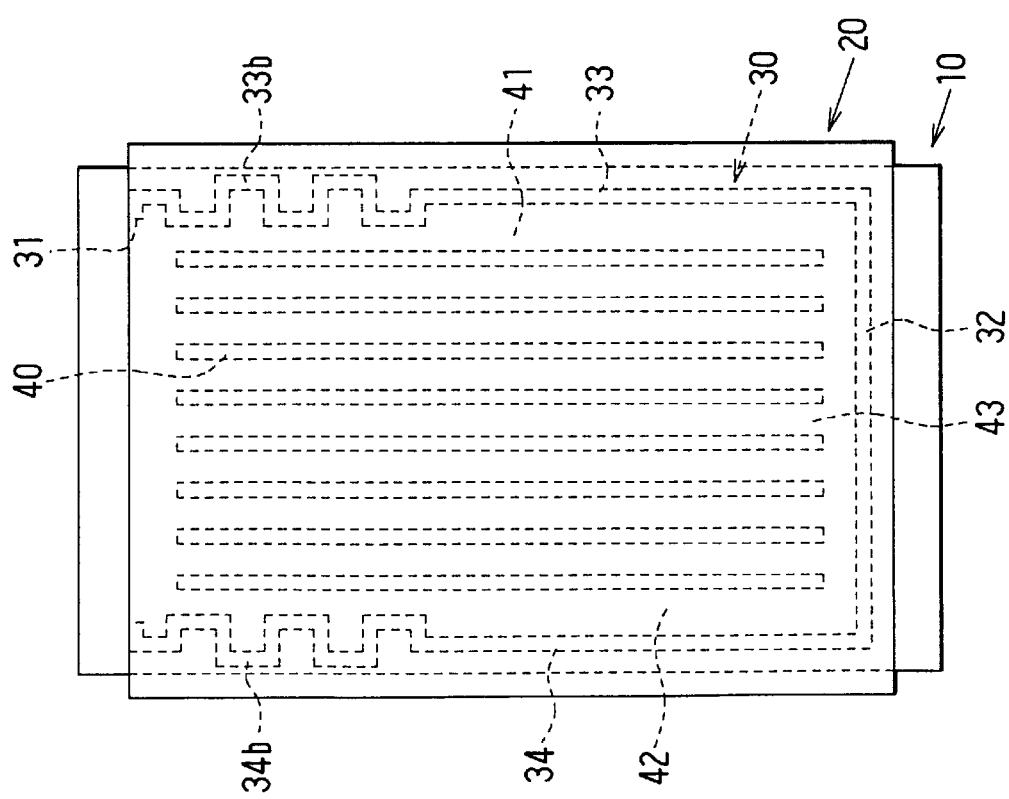
FIG. 23 is a plan view showing a liquid crystal cell as a modification of the fifth embodiment.

A modification of the fifth embodiment is shown in FIG. 23. Spacer walls 40 located both sides of the display area are modified into the shape of 44 and 45, and side seals 33 and 34 are made in a straight shape. The liquid crystal flow speed in outer passages 41 and 42 is restricted by projections of spacer walls 44 and 45, so that the flow speed does not exceed that in inner passages 43.

Figure 24:
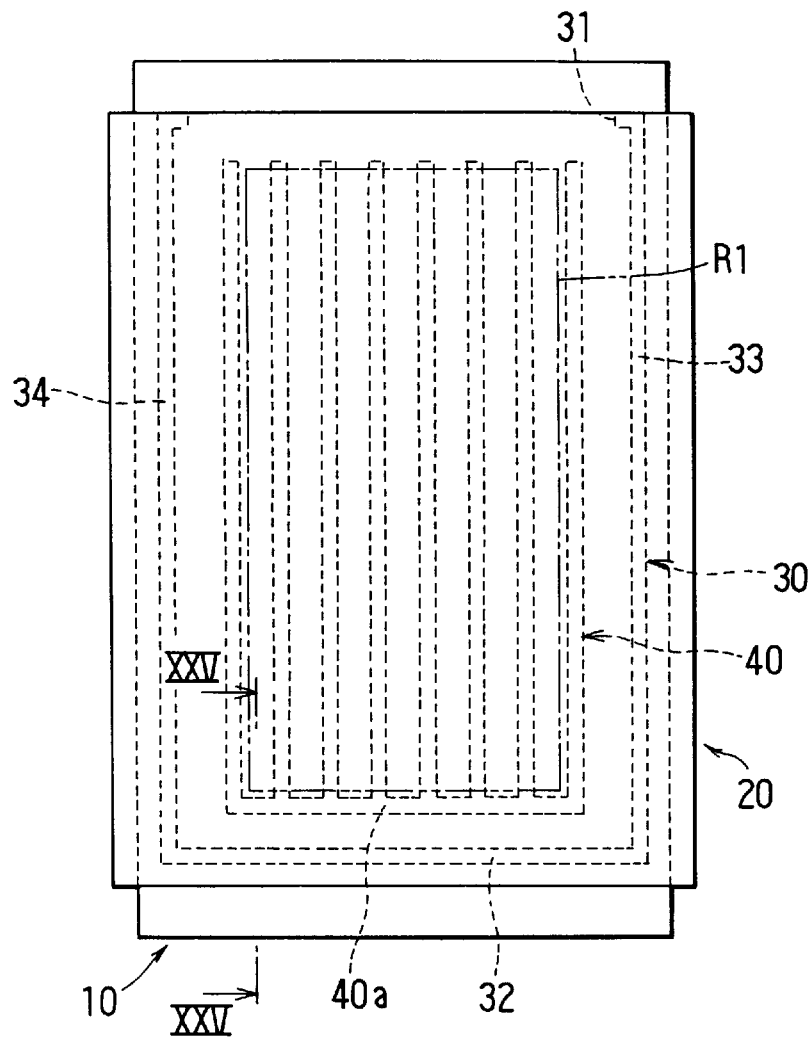
FIG. 24 is a plan view showing a liquid crystal cell as a sixth embodiment according to the present invention.
Figure 25:
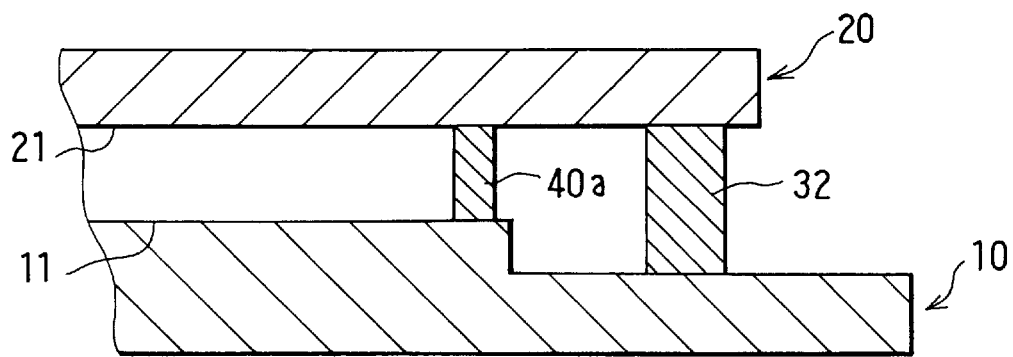
FIG. 25 is a cross-sectional view showing a part of the sixth embodiment, taken along a line XXV—XXV of FIG. 24.

A sixth embodiment according to the present invention is shown in FIGS. 24 and 25. In this embodiment, plural spacer walls 40 formed on first electrode plate 10 are connected by end wall 40a formed at one end of spacer walls 40 which is opposite to the opening defined by end portions 31 of seal member 30. When the liquid crystal is charged into the cell gap, it flows in inner passages 43 and also outer passages 41 and 42. Though the liquid crystal flow speed in outer passages 41 and 42 is faster than that in the inner passages 43, the liquid crystal does not flow into inner passages 43 from outer passages 41 and 42 because the end of inner passages 43 is closed by end wall 40a. This means that the orientation of the liquid crystal in display area R1 is not disturbed by the turn-around flow.

Figure 26:
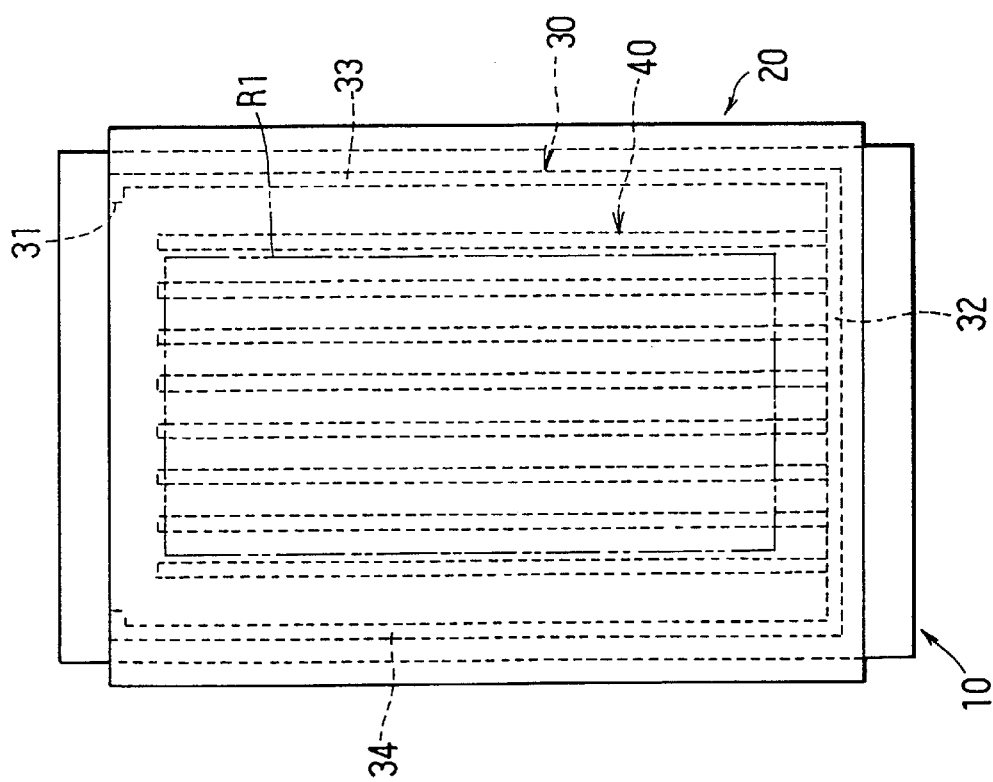
FIG. 26 is a plan view showing a liquid crystal cell as a seventh embodiment according to the present invention.

A seventh embodiment is shown in FIG. 26. In this embodiment, spacer walls 40 are extended so that they abut with end seal 32, forming a dead end for the liquid crystal flow in inner passages 43. Because inner passages 43 are closed at their ends remote from the filling opening, the turn-around flow of the liquid crystal from outer passages 41 and 42 is prevented. Accordingly, the liquid crystal charged into display area R1 is correctly oriented without being disturbed by the turn-around flow.

Figure 27:
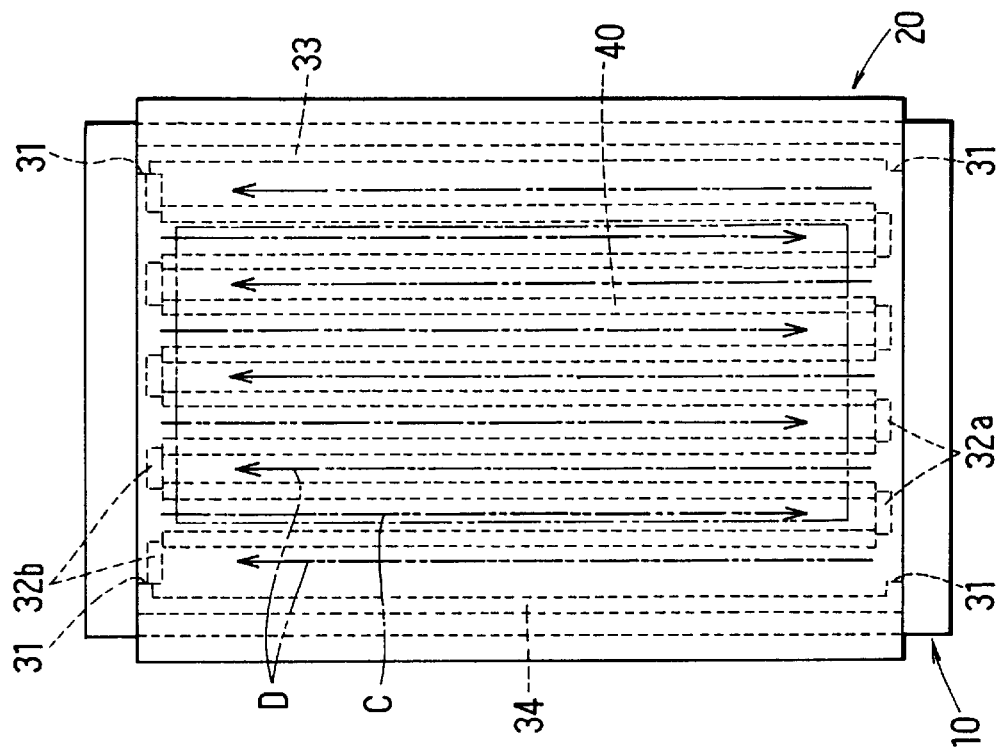
FIG. 27 is a plan view showing a liquid crystal cell as a eighth embodiment according to the present invention.

An eighth embodiment is shown in FIG. 27. In this embodiment, seal member 30 includes side seals 33 and 34, plural end seals 32a and 32b. A pair of end portions 31 of the side seals define an filling opening, and another pair of end portions 31 of the side seals define another filling opening. Plural spacer walls 40 are formed in parallel to each other in the same manner as in the foregoing embodiments. End seals 32a close every other inner passage 43 at one end, and end seals 32b close every other inner passage 43 which is not closed by end seal 32a at the other end as shown in FIG. 27. End seals located in outer passages 41 and 42 close the outer passages at their one end. The liquid crystal is charged into the cell gap from filling openings located at both sides, flow lines of which are shown by arrows C and D in the drawing. Since inner passages 43 in display area R1 are all independent from each other, the liquid crystal flow in each passage does not interfere with those in other passages. Therefore, the liquid crystal flow is not disturbed and the liquid crystal in the display area is correctly oriented. In addition, because filling openings are supported by end seals 32a and 32b in this embodiment, the cell gap can be kept more rigidly in the filling process. The separate filling openings at one side through which the liquid crystal flows in one direction C may be converged into one filling opening, and those at the other side through which the liquid crystal flows in the other direction D may be converged into the other opening.

Figure 28A:
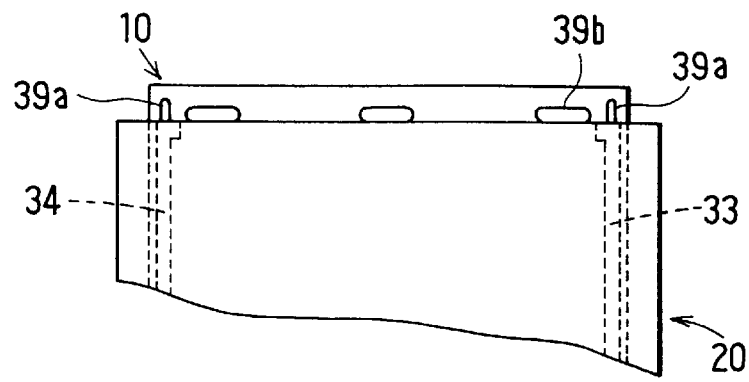
FIGS. 28A and 28B are fragmentary plan views each showing a modification of the seventh and eighth embodiments.
Figure 28B:
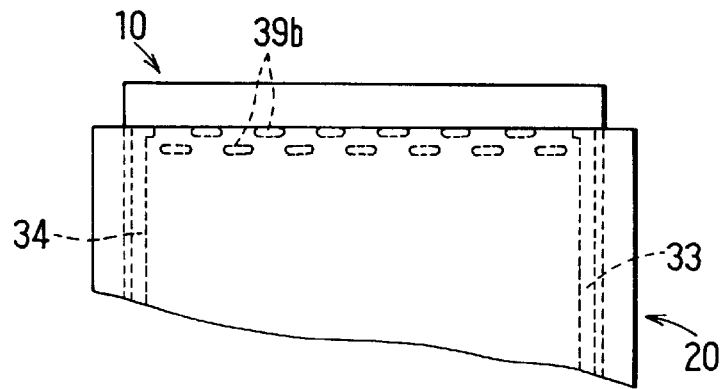
Figure 29:
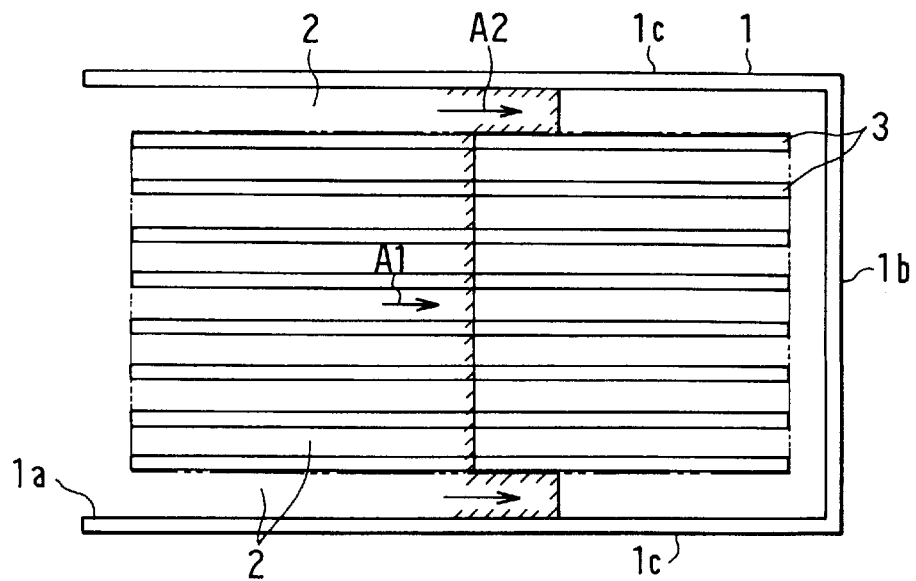
FIG. 29 is a schematic plan view showing a liquid crystal flow, at an earlier stage of a liquid crystal filling process, in a conventional liquid crystal cell.
Figure 30:
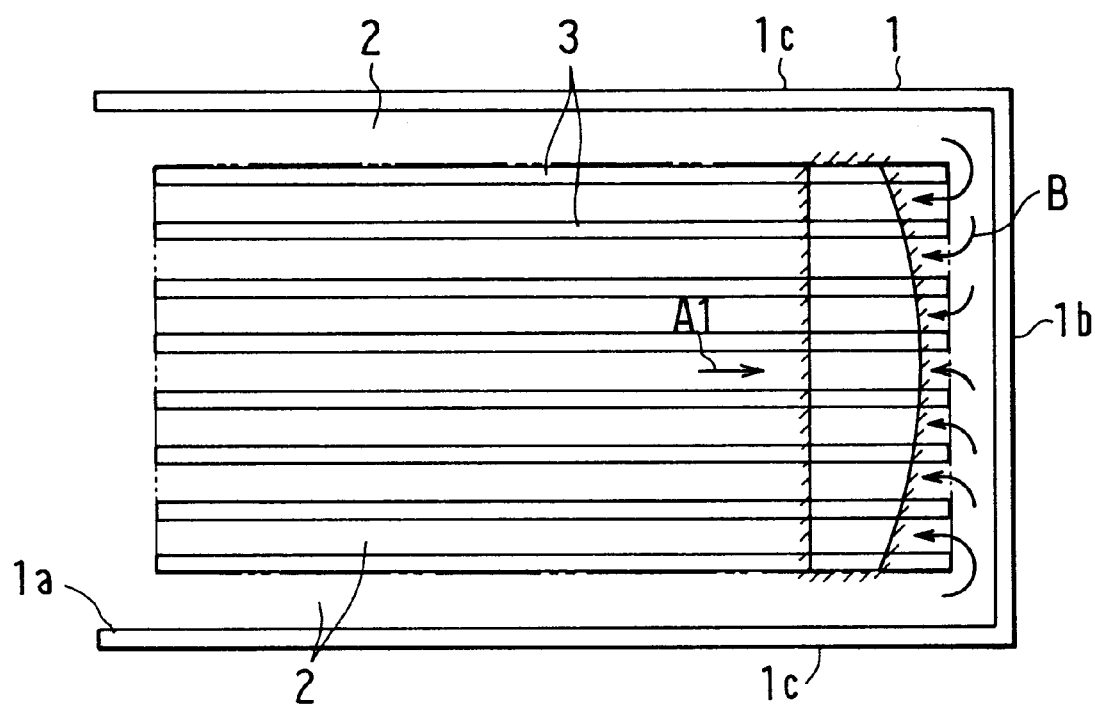
FIG. 30 is a schematic plan view showing a liquid crystal flow, at a later stage of the filling process, in a conventional liquid crystal cell.

The filling opening defined by end portions 31 of seal member 30 in the sixth and seventh embodiments may be modified in the form shown in FIG. 28A or FIG. 28B. In the opening shown in FIG. 28A, a pair of filling guides 39a are disposed at the end of both side seals 33 and 34, and plural seals 39b are dispersively disposed. The filling opening shown in FIG. 28B is interspersed with plural seals 39b. In this particular example, two rows of seals 39a are arranged in a staggered manner in the filling opening.

The present invention may be applied to a liquid crystal cell which does not include a color filter layer. The liquid crystal used in the cell is not limited to smectic liquid crystal but nematic liquid crystal may also be used. The spacer walls may also be made of the same material as the seal member such as a thermosetting resin.

While the present invention has been shown and described with reference to the foregoing preferred embodiments, it will be apparent to those skilled in the art that changes in form and detail may be made therein without departing from the scope of the invention as defined in the appended claims.

What is claimed is:

1. A liquid crystal cell comprising:

a first electrode plate having first electrodes;

a second electrode plate having second electrodes running perpendicularly to the first electrodes, overlapped on the first electrode plate so that the first and second electrodes form an electrode matrix;

a seal member, interposed between the first and second electrode plates, the seal member being disposed to encompass the electrode matrix therein with an opening left open;

spacer walls interposed between the first and second electrode plates, the spacer walls being disposed in parallel to each other within a space encompassed by the seal member so that a first longitudinal end of the spacer walls faces the opening and a second longitudinal end faces the seal member with a space therebetween, the spacer walls forming a cell gap between the first and second electrode plates together with the seal member;

liquid crystal charged into the cell gap from the opening of the seal member to fill the cell gap;

inner passages, formed between the spacer walls, for charging the liquid crystal into the cell gap;

outer passages communicating with the opening, formed at both sides of the inner passages, for charging the liquid crystal into the cell gap;

a passage connecting both outer passages, the passage being formed in the space between the second end of the spacers walls and the seal member; and means for restricting flow of the liquid crystal when it is charged into the cell gap, disposed in the outer passages, so that flow speed of the liquid crystal in the outer passages does not exceed that in the inner passages and the liquid crystal does not turn-around from the outer passages into the inner passages through the connecting passage.

2. The liquid crystal cell as in claim 1, wherein:

the flow restricting means is dam walls formed perpendicularly to the spacer walls in both outer passages.

3. The liquid crystal cell as in claim 2, wherein:

dummy pixels are disposed underneath the dam walls.

4. The liquid crystal cell as in claim 3, wherein:

a black mask layer is disposed underneath the dummy pixels.

5. The liquid crystal cell as in claim 1, wherein:

each of the outer passages is formed between a side seal of the seal member and an outermost spacer wall in parallel thereto; and the flow restricting means is a dam wall formed in the outer passage to close the outer passage.

6. A liquid crystal cell comprising:

a first electrode plate having first electrodes;

a second electrode plate having second electrodes running perpendicularly to the first electrodes, overlapped on the first electrode plate so that the first and second electrodes form an electrode matrix;

a seal member, interposed between the first and second electrode plates, the seal member being disposed to encompass the electrode matrix therein with an opening left open;

spacer walls interposed between the first and second electrode plates, the spacer walls being disposed in parallel to each other within a space encompassed by the seal member so that their longitudinal direction faces the opening, the spacer walls forming a cell gap between the first and second electrode plates together with the seal member;

liquid crystal charged into the cell gap from the opening of the seal member to fill the cell gap;

inner passages, formed between the spacer walls, for charging the liquid crystal into the cell gap;

outer passages, formed at both sides of the inner passages, for charging the liquid crystal into the cell gap; and means for restricting flow of the liquid crystal when it is charged into the cell gap, disposed in the outer passages, so that flow speed of the liquid crystal in the outer passages does not exceed that in the inner passages, wherein the flow restricting means comprises dam walls oriented perpendicularly to the spacer walls in both outer passages and formed by a side seal portion extending from the seal member and a side wall extending from the spacer wall.

7. A liquid crystal cell comprising:

a first electrode plate having first electrodes;

a second electrode plate having second electrodes running perpendicularly to the first electrodes, overlapped on the first electrode plate so that the first and second electrodes form an electrode matrix;

a seal member, interposed between the first and second electrode plates, the seal member being disposed to encompass the electrode matrix therein with an opening left open;

spacer walls interposed between the first and second electrode plates, the spacer walls being disposed in parallel to each other within a space encompassed by the seal member so that their longitudinal direction faces the opening, the spacer walls forming a cell gap between the first and second electrode plates together with the seal member;

liquid crystal charged into the cell gap from the opening of the seal member to fill the cell gap;

inner passages, formed between the spacer walls, for charging the liquid crystal into the cell gap;

outer passages, formed at both sides of the inner passages, for charging the liquid crystal into the cell gap; and means for restricting flow of the liquid crystal when it is charged into the cell gap, disposed in the outer passages, so that flow speed of the liquid crystal in the outer passages does not exceed that in the inner passages, wherein the flow restricting means comprises dam walls oriented perpendicularly to the spacer walls in both outer passages and formed by a side wall extending from the spacer wall.

8. A liquid crystal cell comprising:

a first electrode plate having first electrodes;

a second electrode plate having second electrodes running perpendicularly to the first electrodes, overlapped on the first electrode plate so that the first and second electrodes form an electrode matrix;

a seal member, interposed between the first and second electrode plates, the seal member being disposed to encompass the electrode matrix therein with an opening left open;

spacer walls interposed between the first and second electrode plates, the spacer walls being disposed in parallel to each other within a space encompassed by the seal member so that their longitudinal direction faces the opening, the spacer walls forming a cell gap between the first and second electrode plates together with the seal member;

liquid crystal charged into the cell gap from the opening of the seal member to fill the cell gap;

inner passages, formed between the spacer walls, for charging the liquid crystal into the cell gap;

outer passages, formed at both sides of the inner passages, for charging the liquid crystal into the cell gap; and means for restricting flow of the liquid crystal when it is charged into the cell gap, disposed in the outer passages, so that flow speed of the liquid crystal in the outer passages does not exceed that in the inner passages, wherein the flow restricting means comprises dam walls oriented perpendicularly to the spacer walls in both outer passages and formed by a side seal portion extending from the seal member.

9. A liquid crystal cell comprising:

a first electrode plate having first electrodes;

a second electrode plate having second electrodes running perpendicularly to the first electrodes, overlapped on the first electrode plate so that the first and second electrodes form an electrode matrix;

a seal member, interposed between the first and second electrode plates, the seal member being disposed to encompass the electrode matrix therein with an opening left open;

spacer walls interposed between the first and second electrode plates, the spacer walls being disposed in parallel to each other within a space encompassed by the seal member so that their longitudinal direction faces the opening, the spacer walls forming a cell gap between the first and second electrode plates together with the seal member;

liquid crystal charged into the cell gap from the opening of the seal member to fill the cell gap;

inner passages, formed between the spacer walls, for charging the liquid crystal into the cell gap;

outer passages, formed at both sides of the inner passages, for charging the liquid crystal into the cell gap;

means for restricting flow of the liquid crystal when it is charged into the cell gap, disposed in the outer passages, so that flow speed of the liquid crystal in the outer passages does not exceed that in the inner passages, the flow restricting means comprising dam walls oriented perpendicularly to the spacer walls in both outer passages;

dummy pixels disposed beneath the dam walls; and a black mask layer disposed beneath the dummy pixels, wherein each dam wall includes a through-passage in which flow speed of the liquid crystal when it is charged into the cell gap is lower than flow speed of the liquid crystal in the inner passage.

10. A liquid crystal cell comprising:

a first electrode plate having first electrodes;

a second electrode plate having second electrodes running perpendicularly to the first electrodes, overlapped on the first electrode plate so that the first and second electrodes form an electrode matrix;

a seal member, interposed between the first and second electrode plates, the seal member being disposed to encompass the electrode matrix therein with an opening left open;

spacer walls interposed between the first and second electrode plates, the spacer walls being disposed in parallel to each other within a space encompassed by the seal member so that their longitudinal direction faces the opening, the spacer walls forming a cell gap between the first and second electrode plates together with the seal member;

liquid crystal charged into the cell gap from the opening of the seal member to fill the cell gap;

inner passages, formed between the spacer walls, for charging the liquid crystal into the cell gap;

outer passages, formed at both sides of the inner passages, for charging the liquid crystal into the cell gap; and means for restricting flow of the liquid crystal when it is charged into the cell gap, disposed in the outer passages, so that flow speed of the liquid crystal in the outer passages does not exceed that in the inner passages, wherein the flow restricting means comprises a part of the seal member having a zigzag-shape formed in the outer passage.

11. A liquid crystal cell comprising:

a first electrode plate having first electrodes;

a second electrode plate having second electrodes running perpendicularly to the first electrodes, overlapped on the first electrode plate so that the first and second electrodes form an electrode matrix;

a seal member, interposed between the first and second electrode plates, the seal member being disposed to encompass the electrode matrix therein with an opening left open;

spacer walls interposed between the first and second electrode plates, the spacer walls being disposed in parallel to each other within a space encompassed by the seal member so that their longitudinal direction faces the opening, the spacer walls forming a cell gap between the first and second electrode plates together with the seal member;

liquid crystal charged into the cell gap from the opening of the seal member to fill the cell gap;

inner passages, formed between the spacer walls, for charging the liquid crystal into the cell gap;

outer passages, formed at both sides of the inner passages, for charging the liquid crystal into the cell gap; and means for restricting flow of the liquid crystal when it is charged into the cell gap, disposed in the outer passages, so that flow speed of the liquid crystal in the outer passages does not exceed that in the inner passages, wherein the flow restricting means comprises projections sticking out from the spacer wall to the outer passage.

12. A liquid crystal cell comprising:

a first electrode plate having first electrodes;

a second electrode plate having second electrodes running perpendicularly to the first electrodes, overlapped on the first electrode plate so that the first and second electrodes form an electrode matrix;

a seal member, interposed between the first and second electrode plates, the seal member being disposed to encompass the electrode matrix therein with an opening left open;

spacer walls interposed between the first and second electrode plates, the spacer walls being disposed in parallel to each other within a space encompassed by the seal member so that one end of the spacer walls faces the opening, the spacer walls forming a cell gap between the first and second elector plates together with the seal member;

liquid crystal charged into the cell gap from the opening of the seal member to fill the cell gap;

inner passages formed between the spacer walls with their ends remote from the opening closed, for charging the liquid crystal into the cell gap; and outer passages, formed at both sides of the inner passages, for charging the liquid crystal into the cell gap wherein the closed ends of the inner passages are formed by connecting each end of the spacer walls to each other.

13. A liquid crystal cell comprising:

a first electrode plate having first electrodes;

a second electrode plate having second electrodes running perpendicularly to the first electrodes, overlapped on the first electrode plate so that the first and second electrodes form an electrode matrix;

a seal member, interposed between the first and second electrode plates, the seal member being disposed to encompass the electrode matrix therein with openings left open at both sides;

spacer walls interposed between the first and second electrode plates, the spacer walls being disposed in parallel to each other within a space encompassed by the seal member so that both ends thereof respectively face the openings, the spacer walls forming a cell gap between the first and second electrode plates together with the seal member;

liquid crystal charged into the cell gap from the openings at both sides of the seal member to fill the cell gap;

inner passages, formed between the spacer walls, for charging the liquid crystal into the cell gap, each inner passage being closed at its either end alternately next to each other; and outer passages, formed at both sides of the inner passages, for charging the liquid crystal into the cell gap, each outer passage being closed at its either end.

14. A method of manufacturing a liquid crystal cell having a first and second electrode plate overlapped on each other with a seal member and spacer walls interposed therebetween, forming a cell gap between the first and the second electrode plates, and liquid crystal charged into the cell gap, the method comprising steps of:

forming a seal member encircling a periphery of the second electrode plate except an opening;

forming a plurality of parallel spacer walls on the first electrode plate;

overlapping the first and the second electrode plates on each other with the seal member and the spacer walls interposed therebetween, thereby making the cell gap between both plates and forming inner passages between the spacer walls and outer passages at both sides of the inner passages so that both passages face the opening;

extending side walls from each of the spacer walls to form a dam wall in each of the outer passages so that flow resistance in the outer passages is higher than flow resistance in the inner passages; and charging the liquid crystal into the cell gap from the opening of the seal member through the inner and outer passages, so that flow speed of the liquid crystal through the outer passages does not exceed flow speed of the liquid crystal through the inner passages.

15. A method of manufacturing a liquid crystal cell having a first and second electrode plate overlapped on each other with a seal member and spacer walls interposed therebetween, forming a cell gap between the first and the second electrode plates, and liquid crystal charged into the cell gap, the method comprising steps of:

forming a seal member encircling a periphery of the second electrode plate except an opening;

forming a plurality of parallel spacer walls on the first electrode plate;

overlapping the first and the second electrode plates on each other with the seal member and the spacer walls interposed therebetween, thereby making the cell gap between both plates and forming inner passages between the spacer walls and outer passages at both sides of the inner passages so that one end of both inner and outer passages faces the opening of the seal member and the other end thereof is closed;

connecting each end of the spacer walls to each other to close the ends of the inner passages; and charging the liquid crystal into the cell gap from the opening of the seal member through the inner and outer passages, so that respective flows of the liquid crystal in both passages to not interfere with each other.

16. A liquid crystal cell comprising:

a first electrode plate having first electrodes;

a second electrode plate having second electrodes running perpendicularly to the first electrodes, overlapped on the first electrode plate so that the first and second electrodes form an electrode matrix;

a seal member, interposed between the first and second electrode plates, the seal member being disposed to encompass the electrode matrix therein with an opening left open;

spacer walls interposed between the first and second electrode plates, the spacer walls being disposed in parallel to each other within a space encompassed by the seal member so that their longitudinal direction faces the opening, the spacer walls forming a cell gap between the first and second electrode plates together with the seal member;

liquid crystal charged into the cell gap from the opening of the seal member to fill the cell gap;

inner passages, formed between the spacer walls, for charging the liquid crystal into the cell gap;

outer passages, formed at both sides of the inner passages, for charging the liquid crystal into the cell gap;

means for restricting flow of the liquid crystal when it is charged into the cell gap, disposed in the outer passages, so that flow speed of the liquid crystal in the outer passages does not exceed that in the inner passages, the flow restricting means comprising dam walls oriented perpendicularly to the spacer walls in both outer passages; and dummy pixels disposed beneath the dam walls, wherein each dam wall includes a through-passage in which flow speed of the liquid crystal when it is charged into the cell gap is lower than flow speed of the liquid crystal in the inner passage.

17. A method of manufacturing a liquid crystal cell having a first and second electrode plate overlapped on each other with a seal member and spacer walls interposed therebetween, forming a cell gap between the first and the second electrode plates, and liquid crystal charged into the cell gap, the method comprising steps of:

forming a seal member encircling a periphery of the second electrode plate except an opening;

forming a plurality of parallel spacer walls on the first electrode plate;

overlapping the first and the second electrode plates on each other with the seal member and the spacer walls interposed therebetween, thereby making the cell gap between both plates and forming inner passages between the spacer walls and outer passages at both sides of the inner passages so that both passages face the opening;

forming a dam wall in each of the outer passages from a side seal portion extending from the seal member so that flow resistance in the outer passages is higher than flow resistance in the inner passages; and charging the liquid crystal into the cell gap from the opening of the seal member through the inner and outer passages, so that flow speed of the liquid crystal through the outer passages does not exceed flow speed of the liquid crystal through the inner passages.

18. A method of manufacturing a liquid crystal cell having a first and second electrode plate overlapped on each other with a seal member and spacer walls interposed therebetween, forming a cell gap between the first and the second electrode plates, and liquid crystal charged into the cell gap, the method comprising steps of:

forming a seal member encircling a periphery of the second electrode plate except an opening;

forming a plurality of parallel spacer walls on the first electrode plate;

overlapping the first and the second electrode plates on each other with the seal member and the spacer walls interposed therebetween, thereby making the cell gap between both plates and forming inner passages between the spacer walls and outer passages at both sides of the inner passages so that both passages face the opening;

forming a dam wall in each of the outer passages from a side seal portion extending from the seal member and a side wall extending from the spacer wall so that flow resistance in the outer passages is higher than flow resistance in the inner passages; and charging the liquid crystal into the cell gap from the opening of the seal member through the inner and outer passages, so that flow speed of the liquid crystal through the outer passages does not exceed flow speed of the liquid crystal through the inner passages.

19. A method of manufacturing a liquid crystal cell having a first and second electrode plate overlapped on each other with a seal member and spacer walls interposed therebetween, forming a cell gap between the first and the second electrode plates, and liquid crystal charged into the cell gap, the method comprising steps of:

forming a seal member encircling a periphery of the second electrode plate except an opening;

forming a plurality of parallel spacer walls on the first electrode plate;

overlapping the first and the second electrode plates on each other with the seal member and the spacer walls interposed therebetween, thereby making the cell gap between both plates and forming inner passages between the spacer walls and outer passages at both sides of the inner passages so that both passages face the opening;

forming a dam wall with a through-passage in each of the outer passages so that flow resistance in the outer passages is higher than flow resistance in the inner passages; and charging the liquid crystal into the cell gap from the opening of the seal member through the inner and outer passages, so that flow speed of the liquid crystal through the outer passages does not exceed flow speed of the liquid crystal through the inner passages.

20. A method of manufacturing a liquid crystal cell having a first and second electrode plate overlapped on each other with a seal member and spacer walls interposed therebetween, forming a cell gap between the first and the second electrode plates, and liquid crystal charged into the cell gap, the method comprising steps of:

forming a seal member encircling a periphery of the second electrode plate except an opening;

forming a plurality of parallel spacer walls on the first electrode plate;

overlapping the first and the second electrode plates on each other with the seal member and the spacer walls interposed therebetween, thereby making the cell gap between both plates and forming inner passages between the spacer walls and outer passages at both sides of the inner passages so that both passages face the opening;

forming a flow restricting means comprising a part of the seal member having a zigzag shape in each of the outer passages so that flow resistance in the outer passages is higher than flow resistance in the inner passages; and charging the liquid crystal into the cell gap from the opening of the seal member through the inner and outer passages, so that flow speed of the liquid crystal through the outer passages does not exceed flow speed of the liquid crystal through the inner passages.

21. A method of manufacturing a liquid crystal cell having a first and second electrode plate overlapped on each other with a seal member and spacer walls interposed therebetween, forming a cell gap between the first and the second electrode plates, and liquid crystal charged into the cell gap, the method comprising steps of:

forming a seal member encircling a periphery of the second electrode plate except an opening;

forming a plurality of parallel spacer walls on the first electrode plate;

overlapping the first and the second electrode plates on each other with the seal member and the spacer walls interposed therebetween, thereby making the cell gap between both plates and forming inner passages between the spacer walls and outer passages at both sides of the inner passages so that both passages face the opening;

forming a flow restricting means in each of the outer passages comprising projections sticking out from the spacer wall into each outer passage so that flow resistance in the outer passages is higher than flow resistance in the inner passages; and charging the liquid crystal into the cell gap from the opening of the seal member through the inner and outer passages, so that flow speed of the liquid crystal through the outer passages does not exceed flow speed of the liquid crystal through the inner passages.

22. A method of manufacturing a liquid crystal cell having a first and second electrode plate overlapped on each other with a seal member and spacer walls interposed therebetween, forming a cell gap between the first and the second electrode plates, and liquid crystal charged into the cell gap, the method comprising steps of:

forming a seal member encircling a periphery of the second electrode plate except an opening;

forming a plurality of parallel spacer walls on the first electrode plate;

overlapping the first and the second electrode plates on each other with the seal member and the spacer walls interposed therebetween, the spacer walls being arranged so that first longitudinal ends thereof face the opening and second longitudinal ends thereof face the seal member with a space therebetween thereby making the cell gap between both plates and forming inner passages between the spacer walls and outer passages having a flow resistance higher than that of the inner passages at both sides of the inner passages so that both passages face the opening;

forming a passage connecting both outer passages in the space between the second end of the spacers walls and the seal member; and charging the liquid crystal into the cell gap from the opening of the seal member through the inner and outer passages, so that flow speed of the liquid crystal through the outer passages does not exceed flow speed of the liquid crystal through the inner passages and the liquid crystal does not turn-around from the outer passages into the inner passages through the connecting passage.

* * * * *